(12) United States Patent
Ota et al.

(10) Patent No.: US 7,803,471 B1
(45) Date of Patent: Sep. 28, 2010

(54) MAGNETIC TAPE, ITS CLEANING METHOD, AND OPTICAL SERVOTRACK FORMING/CLEANING APPARATUS

(75) Inventors: Hiroyuki Ota, Kyoto (JP); Haruhiko Fujisawa, Kyoto (JP); Naoki Mukai, Takatsuki (JP); Satoru Fukiage, Ueno (JP); Kenji Sano, Nagaokakyo (JP); Shigeo Fujitani, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 1635 days.

(21) Appl. No.: 10/343,432

(22) PCT Filed: Dec. 28, 2001

(86) PCT No.: PCT/JP01/11610
§ 371 (c)(1),
(2), (4) Date: Jan. 31, 2003

(87) PCT Pub. No.: WO02/054391
PCT Pub. Date: Jul. 11, 2002

(30) Foreign Application Priority Data

Dec. 28, 2000 (JP) .............................. 2000-403216
Dec. 28, 2000 (JP) .............................. 2000-403217

(51) Int. Cl.
*G11B 5/706* (2006.01)
(52) U.S. Cl. .................................................. 428/845.6
(58) Field of Classification Search ............... 428/842.5, 428/845.5
See application file for complete search history.

(56) References Cited

U.S. PATENT DOCUMENTS 5,067,039 A 11/1991 Godwin et al.
5,396,392 A 3/1995 Watanabe et al.
5,419,733 A 5/1995 Johnson et al.
6,103,365 A 8/2000 Ishii et al.

(Continued)

FOREIGN PATENT DOCUMENTS

JP 62-80819 A 4/1987

(Continued)

OTHER PUBLICATIONS

Machine translation of JP 2000-293836, Oct. 2000.*

(Continued)

*Primary Examiner*—Holly Rickman
(74) *Attorney, Agent, or Firm*—Birch, Stewart, Kolasch & Birch, LLP

(57) ABSTRACT

A magnetic tape which comprises a nonmagnetic support, a magnetic layer which is formed on one surface of the nonmagnetic support, and a backcoat layer which comprises a binder and nonmagnetic powder containing carbon black as a component and which is formed on the other surface of the nonmagnetic support, having pits for optical servo formed thereon, characterized in that the average of the reflectance on the flat portion of the backcoat layer is 8.5% or higher, and that the maximum rate of fluctuation of the reflectance on the flat portion, depending on a position of the magnetic tape:

[Maximum of absolute value of (Reflectance−Average reflectance)]×100/(Average reflectance)

is 10% or lower. This magnetic tape is high in the initial S/N of the servo signal, and also high in the S/N of the servo signal found after the magnetic tape is run twice.

2 Claims, 9 Drawing Sheets

U.S. PATENT DOCUMENTS

| | | |
|---|---|---|
| 6,115,352 A | 9/2000 | Ohno et al. |
| 6,445,676 B1 | 9/2002 | Fujii et al. |
| 6,478,879 B1 | 11/2002 | Jackson |
| 6,558,774 B1 * | 5/2003 | Saliba et al. ............ 428/156 |
| 6,768,608 B2 | 7/2004 | Saliba et al. |

FOREIGN PATENT DOCUMENTS

| | | | |
|---|---|---|---|
| JP | 3-141087 A | 6/1991 |
| JP | 5-274840 A | 10/1993 |
| JP | 6-119754 A | 4/1994 |
| JP | 6-124568 A | 5/1994 |
| JP | 6-224172 A | 8/1994 |
| JP | 7-78336 A | 3/1995 |
| JP | 7-254147 A | 10/1995 |
| JP | 10-149578 A | 6/1998 |
| JP | 10-172179 A | 6/1998 |
| JP | 11-213384 A | 8/1999 |
| JP | 11-242814 A | 9/1999 |
| JP | 11-259856 A | 9/1999 |
| JP | 11-339254 A | 12/1999 |
| JP | 2000-57560 A | 2/2000 |
| JP | 2000-117201 A | 4/2000 |
| JP | 2000-268360 A | 9/2000 |
| JP | 2000-293836 A | 10/2000 |
| JP | 2000-293845 A | 10/2000 |
| JP | 2002-150550 A | 5/2002 |

OTHER PUBLICATIONS

Machine translation of JP 11-242814, Sep. 1999.*
Machine translation of JP 10-172179, Jun. 1998.*

* cited by examiner

MAGNETIC TAPE, ITS CLEANING METHOD, AND OPTICAL SERVOTRACK FORMING/CLEANING APPARATUS

This application is the national phase under 35 U.S.C. §371 of PCT International Application No. PCT/JP01/11610 which has an International filing date of Dec. 28, 2001, which designated the United States of America.

TECHNICAL FIELD

The present invention relates to a magnetic tape in which pits for optical servo tracks are formed on a backcoat layer, a method for cleaning a magnetic tape, and an apparatus for forming and cleaning optical servo tracks.

BACKGROUND ART

Magnetic tapes have found various applications in audio tapes, videotapes, data backup tapes for computers, etc. In particular, in the field of magnetic tapes for data-backup (or backup tapes), tapes having memory capacities of several tens GB or more per one reel are commercialized in association with increased capacities of hard discs for back-up. Therefore, it is inevitable to increase the capacity of this type of a tape for data-backup so as to correspond to a further increased capacity of a hard disc. It is also necessary to increase the feeding speed of tape and a relative speed between the tape and heads in order to quicken the access speed and the data transfer speed.

To increase the capacity of tape for data-backup per one reel, the following are necessary: (1) the length of a tape per reel is increased by decreasing the total thickness of the tape; (2) the thickness demagnetization is decreased to shorten the recording wavelength by forming a magnetic layer with a thickness as very thin as 0.3 µm or less; and (3) the recording density in the tape widthwise direction is increased by narrowing the widths of the tracks to 15 µm or less.

When the thickness of the magnetic layer is reduced to 0.3 µm or less, the durability of the tape tend to lower. Therefore, at least one primer layer is provided between a nonmagnetic support and the magnetic layer. When the recording wavelength is shortened, the influence of spacing between the magnetic layer and the magnetic heads becomes serious. Thus, if the magnetic layer has large projections or dents, an output decreases due to spacing loss, and thus an error rate increases.

When the magnetic layer is formed with a thickness so thin as 0.3 µm or less and concurrently the recording wavelength is decreased, magnetic flux leakage from the magnetic recording medium is decreased. Therefore, it is preferable to use reproducing heads which make use of megnetoresistance elements capable of achieving high output from very small magnetic fluxes (hereinafter, referred to as MR heads).

When the recording density in the tape-widthwise direction is increased by narrowing the width of the tracks (the width of data tracks on which signals are recorded) to 15 µm or less, reproduction output decreases due to off-track. To overcome such a problem, track servo becomes necessary.

One of such track servo systems is an optical track servo system, in which pits for optical servo are formed by irradiation with laser beams or by depression with a stamper, and such pits are optically detected for servo tracking.

As other optical track servo systems of this type, JP-A-03-141087 discloses the formation of pits for optical servo on the magnetic layer of a floptical disc (an optical servo track type floppy disc), and JP-A-11-339254 and JP-A-11-213384 disclose the formation of pits for optical servo are formed on the backcoat layer of a magnetic tape.

In the optical track servo systems in which pits for optical servo are formed on the backcoat layer, the track servo is performed by detecting a difference in reflectance between the pits and the flat portion of the backcoat layer. In particular, when the backcoat layer having such pits is irradiated with light, light randomly reflects on the pits, and therefore, the intensity of reflected light which enters an optical detector is low. On the other hand, light regularly reflects on the flat portion, and thus, the intensity of reflecting light is high. This system makes use of such a difference to trace the servo tracks formed as the pits. Specifically, interlocking with the servo tracking on the backcoat layer, the magnetic head which records or reproduces signals on or from the magnetic layer is moved to perform servo tracing on magnetically recording tracks.

According to this system, if the pits for optical servo are formed by irradiation with conventional laser beams, the intensity of light randomly reflecting on the pits can be sufficiently lowered. However, the intensity of light which reflects on the flat portion of the backcoat layer of a conventional magnetic tape is low, and the reflectance on the flat portion largely fluctuates depending on a site of the magnetic tape. Thus, it is impossible to sufficiently increase the ratio of S/N of optical servo signals. The reason therefor is that keen attentions are paid to only the tape running performance on the backcoat layer of the a conventional magnetic tape, but not to the reflectance thereon.

In case where pits are formed in a backcoat layer by irradiation with laser beams or by depression with a stamper, the peripheries (or the edges) of the pits are inevitably raised, which causes the following problems. In case where the total thickness of a magnetic tape is 6 µm or less, the rigidity of the tape (i.e., $ET^3$ in which E is a Young's modulus of a tape, and T is a total thickness of the tape) decreases, and therefore, it is needed to decrease the winding tension for the tape which is running. In this case, if the specific positions of the magnetic tape are raised as described above, the track-formed portion of the tape wound onto a reel becomes extremely high, which results in a disorder in the winding of the tape.

In addition, if the tape has the raised portions as described above, they are pressed against the side of the recording layer (magnetically recording surface) of the magnetic tape, so that the surface of the recording layer becomes uneven, which results in low reproduction output. In case of a magnetic disc employing the optical servo track system, such winging as is made on the tape is unnecessary, and therefore, such disorder in the winding or the pressing by the raised portions do not occur, even though the peripheries of the pits for optical servo are raised. That is, these problems are peculiar to the magnetic tapes. To solve these problems, it is desirable to decrease the height of the raised portions of the tape to not higher than the height of the maximum projection of the flat portion thereof.

When the pits are formed on the backcoat layer by irradiation with laser beams, the coating surface of the backcoat layer is baked off by the energy of laser beams so as to form a pattern of pits. This method provides higher productivity, however, has a problem in that the numerous particles of burnt residues as the result of the laser baking for forming a pattern, undesirably, adhere to the pits and their peripheries. If the burnt residues are left as they are, they cause not only contamination of the tape-running system but also decrease in the ratio of S/N of optically read signals on the backcoat layer and the dropping-out of the magnetic layer due to the adhesion of the burnt residues. Further, the reflectance on the flat portion of the backcoat layer decreases, so that the reflectance in the lengthwise direction of the tape largely fluctuates. This fluctuation also decreases the ratio of S/N of optically read signals. Therefore, the removal of such burnt residues is necessary.

It is known that burnt residues which remain after the formation of pits for optical servo by irradiation with laser beams are removed using solid $CO_2$, which has been used for removing such burnt residues from a floptical disc having pits for optical servo formed thereon (U.S. Pat. No. 5,419,733). In case of a floptical disc, the surface area to be cleaned is limited, and the solid $CO_2$ can easily be sprayed to clean the surface by rotating the disk a number of times at a high velocity.

If this method is applied to clean a magnetic tape, the total surface area of the lengthy tape to be cleaned is enormous, and the amount of solid $CO_2$ blown onto the tape a lot of times becomes far larger as compared with the disc. Therefore, the cleaning efficiency is poor. The magnetic tape confronts a further problem from which the floptical disc has never suffered: that is, the burnt residues remaining after the formation of the servo pattern by irradiation with laser beams adhere and transfer when the magnetic tape is again wound, and such burnt residues, in turn, adhere to the drive guide roller and the magnetic heads.

Alternatively, the surface of the magnetic tape is cleaned, for example, by allowing a tissue cleaning tape to contact with the front and back surfaces of a magnetic tape. This method is unsatisfactory, because the cleaning of the flat portion of the backcoat layer is insufficient, and also the effect of cleaning the interiors of servo dots formed as pits by laser beams is poor. The above cleaning treatment in combination with a blade treatment is also possible. However, a strong blade treatment may damage the backcoat layer, since the backcoat layer has a lower strength than the magnetic layer. On the contrary, if a weak blading treatment is made on the backcoat layer, the burnt residues thereon cannot be removed. Thus, this method is unsuitable for large-scale production, because selection of the conditions for the cleaning is difficult. Still worse, this method has substantially no effect of cleaning the interiors of the servo dots formed as the pits.

The present invention has been completed to solve the foregoing problems of the prior art.

SUMMARY OF THE INVENTION

The present inventors have intensively researched a magnetic tape on which optical servo signals having a high S/N ratio (signal to noise) can be recorded. As a result, they have discovered that the ratio of S/N is increased by setting an average of the reflectance on the flat portion of a backcoat layer at 8.5% or higher, and also by decreasing the rate of fluctuation of the reflectance on the flat portion depending on a position of the magnetic tape (a site on the magnetic tape), which is defined by the following equation, to 10% or lower:

[Maximum of absolute value of (Reflectance−Average of reflectance)]×100/(Average of reflectance)

According to the first aspect, the present invention relates to a magnetic tape comprising a nonmagnetic support; a magnetic layer which is formed on one surface of the nonmagnetic support; and a backcoat layer which contains a binder and nonmagnetic powder containing carbon black as one component and which is formed on the other surface of the nonmagnetic support, having pits for optical servo formed thereon, wherein the average of the reflectance on the flat portion of the backcoat layer is 8.5% or higher, and wherein the maximum rate of fluctuation of the reflectance on the flat portion depending on a position of the magnetic tape, determined by the following equation, is 10% or lower.

[Maximum of absolute value of (Reflectance−Average of reflectance)]×100/(Average of reflectance)

To set the average of the reflectance on the flat portion of the backcoat layer at 8.5% or higher, and also to lower the fluctuation of the reflectance on the flat portion depending on a site of the magnetic tape to 10% or lower, the content of the nonmagnetic powder in the backcoat layer:

(Weight of nonmagnetic powder)×100/(Weight of nonmagnetic powder+Weight of binder)

is controlled to 50 wt. % or more; the surface roughness Ra of the flat portion of the backcoat layer, measured with an atomic force microscope (AFM), is controlled to 30 nm or less; and the half width of the fluctuation of the surface roughness Ra depending on a site of the magnetic tape is controlled to 5 nm or less.

If the ratio of carbon black in the nonmagnetic powder is increased to 80 wt. % or more, it becomes easy to form the pits for optical servo (i.e., servo holes) by irradiation with laser beams. The addition of 20 wt. % or less of iron oxide (e.g., red iron oxide) in combination with carbon black is effective to improve the strength of the backcoat layer.

The present inventors also have carefully researched the solution of the above problem of a disorder in the winding of a magnetic tape having a total thickness as thin as 6 μm or less. As a result, the inventors have found out that the disorder in the winding of the tape can be prevented by setting the value of H/T at 1/50 or less, preferably 1/100 or less, wherein T is the total thickness of the magnetic tape, and H is the average height of 100 raised portions around the peripheries of the pits of the backcoat layer (the peripheral portions of the pits for optical servo).

Another object of the present invention is to provide a method and an apparatus for efficiently removing the burnt residue (powder, etc.) which form when pits for optical servo are formed on the backcoat layer of a magnetic tape by irradiation with laser beams and which adhere to the interiors of the pits and their peripheries on the backcoat layer, and also to provide a magnetic tape having a low error rate.

As a result of the researches of a method for efficiently removing such burnt residues, the following methods are found to be effective: (1) cleaning by using $CO_2$, and (2) cleaning by using a raised fabric or the like. The method (1) using $CO_2$ requires a relatively large-scale apparatus, while it is relatively low in running cost, since only consumable is $CO_2$. On the other hand, the method (2) using a raised fabric requires a relatively simple apparatus, although consuming raised fabrics.

Therefore, according to the second aspect, the present invention relates to a method for cleaning a magnetic tape which comprises a nonmagnetic support, a magnetic layer formed on one surface of the nonmagnetic support, and a backcoat layer which contains nonmagnetic powder and a binder and which is formed on the other surface of the nonmagnetic support, having pits for optical servo, formed thereon by irradiation with laser beams, which method comprises the step of spraying solid $CO_2$ onto the surface of the backcoat layer, thereby removing burnt residues which forms after the laser irradiation and adheres to the pits for optical servo and their peripheries, so as to clean the backcoat layer.

According to the third aspect, the present invention relates to an apparatus for forming and cleaning optical servo tracks of a magnetic tape, which apparatus comprises a tape-feeding mechanism for feeding a reeled magnetic tape in a predetermined direction; a unit for forming optical servo tracks by forming pits on the surface of the backcoat layer of the fed magnetic tape by irradiation with laser beams; a unit for cleaning the surface of the backcoat layer after the formation of the pits; and a mechanism for winding the magnetic tape after cleaning. The cleaning unit comprises a section for spraying solid $CO_2$ onto the pits for optical servo and their peripheries on the backcoat layer; a section for sucking the burnt residues which are blown off by the solid $CO_2$ and adhere to the pits and their peripheries; and a section for wiping the surface of the backcoat layer after the suction of the burnt residues.

According to the fourth aspect, the present invention relates to a method for cleaning a magnetic tape which comprises a nonmagnetic support, a magnetic layer formed on one surface of the nonmagnetic support, and a backcoat layer which contains nonmagnetic powder and a binder and which is formed on the other surface of the nonmagnetic support, having pits for optical servo formed thereon by irradiation with laser beams, which method comprises the steps of allowing a raised fabric or a woven or nonwoven fabric having raising fibers thereon, to contact with the surface of the backcoat layer having the pits thereon, and removing the burnt residues adhered to the pits and their peripheries.

According to the fifth aspect, the present invention relates to an apparatus for forming and cleaning optical servo tracks of a magnetic tape, which apparatus comprises a tape-feeding mechanism for feeding a reeled magnetic tape in a predetermined direction; a unit for forming optical servo tracks by forming pits on the surface of the backcoat layer of the fed magnetic tape by irradiation with laser beams; a unit for cleaning the surface of the backcoat layer after the formation of the pits; and a winding means for winding the magnetic tape after cleaning. The cleaning unit comprises a section for allowing a raised fabric or a woven or nonwoven fabric having raising fibers thereon to contact with the surface of the backcoat layer so as to clean the same, and a section for wiping and removing unwanted particles adhered to the surface of the backcoat layer.

BEST EMBODIMENTS FOR CARRYING OUT INVENTION

Firstly the cleaning method (1) using $CO_2$ is described.

A magnetic tape is caused to run in the lengthwise direction, while the backcoat layer thereof is being irradiated with laser beams to form pits for optical servo on the backcoat layer. After this step, solid $CO_2$ is sprayed onto the surface of the backcoat layer having the pits formed thereon. Thereby, the burnt residues adhered to the interiors of the pits and their peripheries are removed only by causing the magnetic tape to run once.

Figure 1:
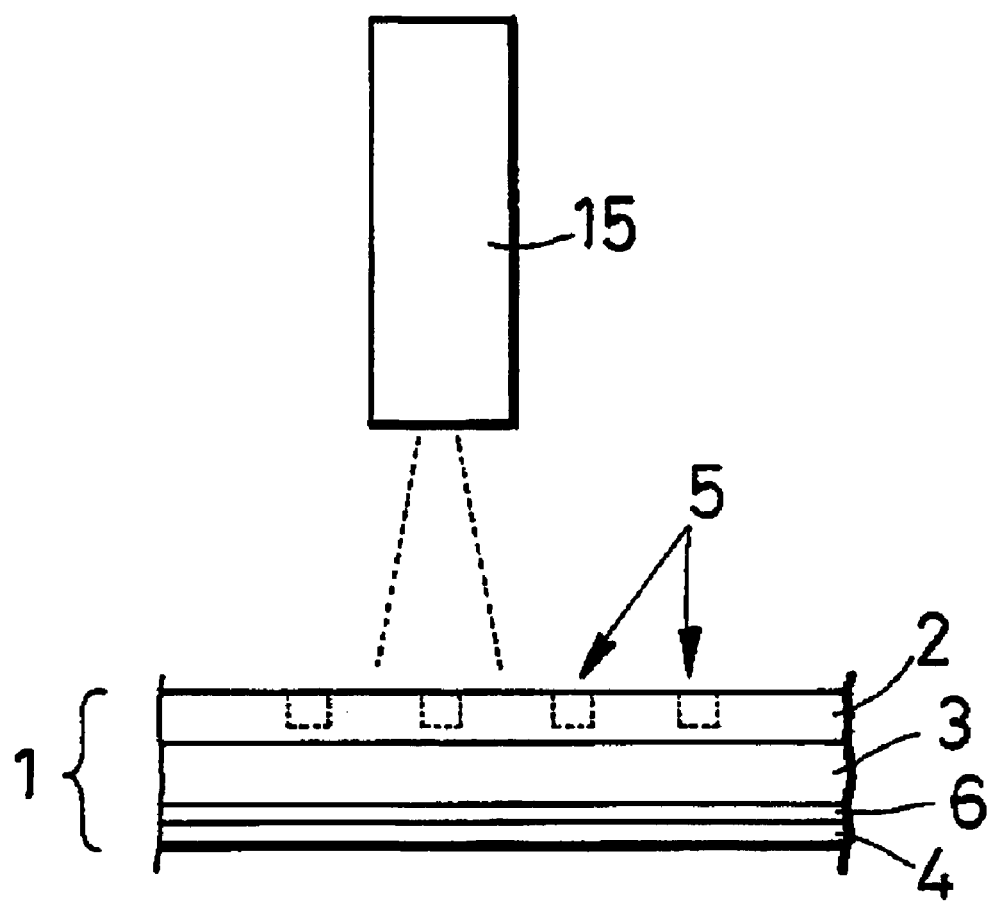
FIG. 1 is a schematic diagram illustrating the spraying of solid $CO_2$ onto the surface of the backcoat layer of a magnetic tape.
Figure 2:
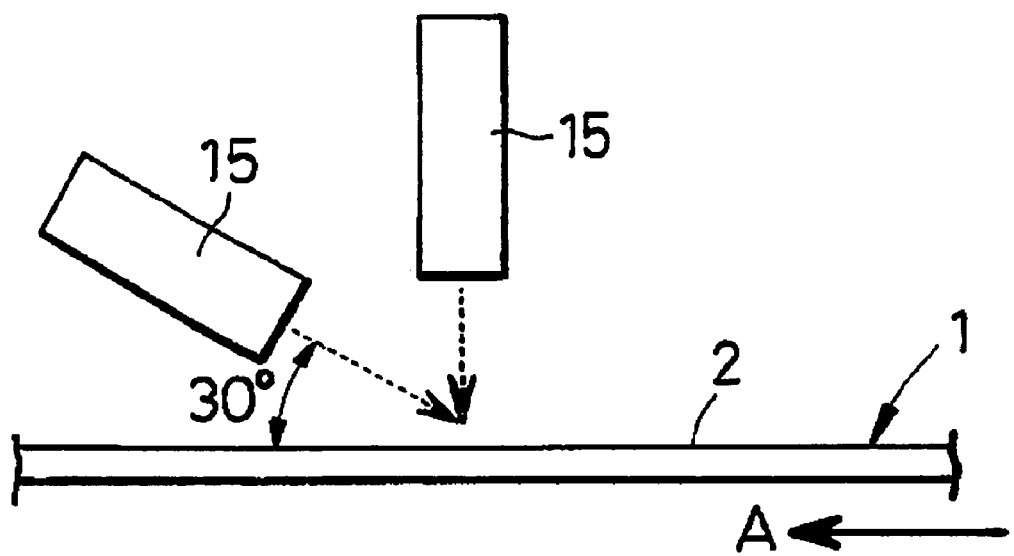
FIG. 2 a schematic diagram illustrating an angle at which a nozzle for spraying $CO_2$ is set.
Figure 3:
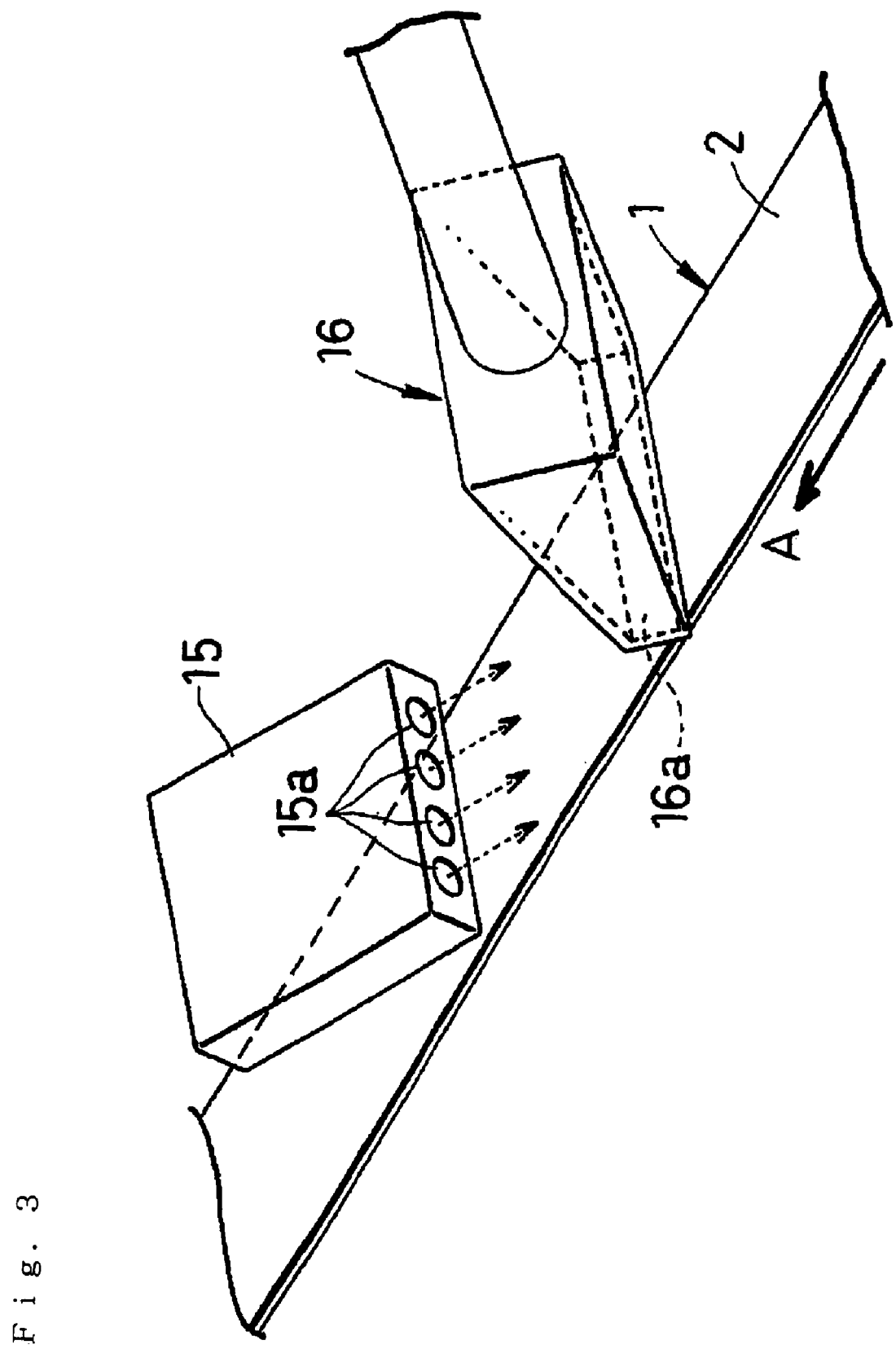
FIG. 3 is a perspective view of the essential portion of an apparatus for forming and cleaning optical servo tracks, illustrating a $CO_2$-spraying section and a sucking section.

As shown in FIGS. 1 to 3, the magnetic tape (1) to be cleaned is run at a high speed, for example, about 10 m/sec., while solid $CO_2$ (which has been in a liquid phase when sprayed, and is changed to a solid state immediately after sprayed) is sprayed onto the surface of the backcoat layer (2), to efficiently remove the particles adhered to the surface of the backcoat layer (2). In FIGS. 1 to 3, numeral 3 refers to a nonmagnetic support; 4, to a magnetic layer; 5, to a servo pattern consisting of a plurality of pits for optical servo; and 6, to a primer layer.

Although not bound by any theory, the reason why the burnt residues can be efficiently removed by spraying such solid $CO_2$ may be considered as follows. Carbon dioxide ($CO_2$) sprayed onto the surface of the backcoat layer is in a liquid state at a specific temperature or lower under a specific pressure or higher. However, after the spraying, the pressure rapidly lowers, so that carbon dioxide is changed from a liquid state to a solid state to form dry ice fine particles. These dry ice particles are sprayed from a spray nozzle (15) and then struck onto a part of the surface of the backcoat layer (2) of the magnetic tape (1) to fly and spread over the peripheral area of such a part of the backcoat layer (the dry ice particles forms carbon dioxide gas in short time). The dry ice particles adsorb the particles (mainly the burnt residues) adhered to the surface of the backcoat layer when struck thereto. Thus, the burnt residues on the surface of the backcoat layer are separated and removed. As shown in FIG. 3, a sucking means such as a suction nozzle (16) sucks the gas in the $CO_2$-sprayed region or its periphery in this step, so that the burnt residues can be more efficiently removed.

Figure 4:
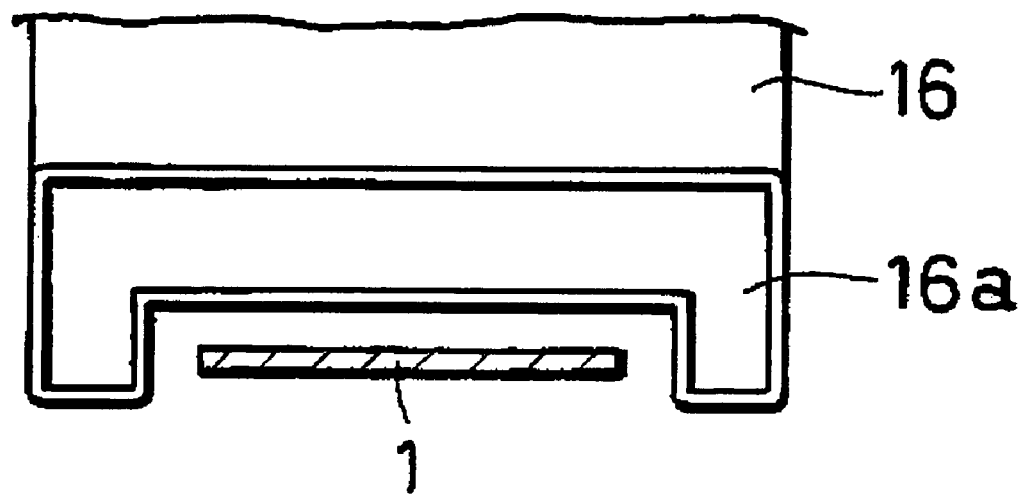
FIG. 4 is a schematic diagram illustrating an example of a sucking means (a suction nozzle).
Figure 5:
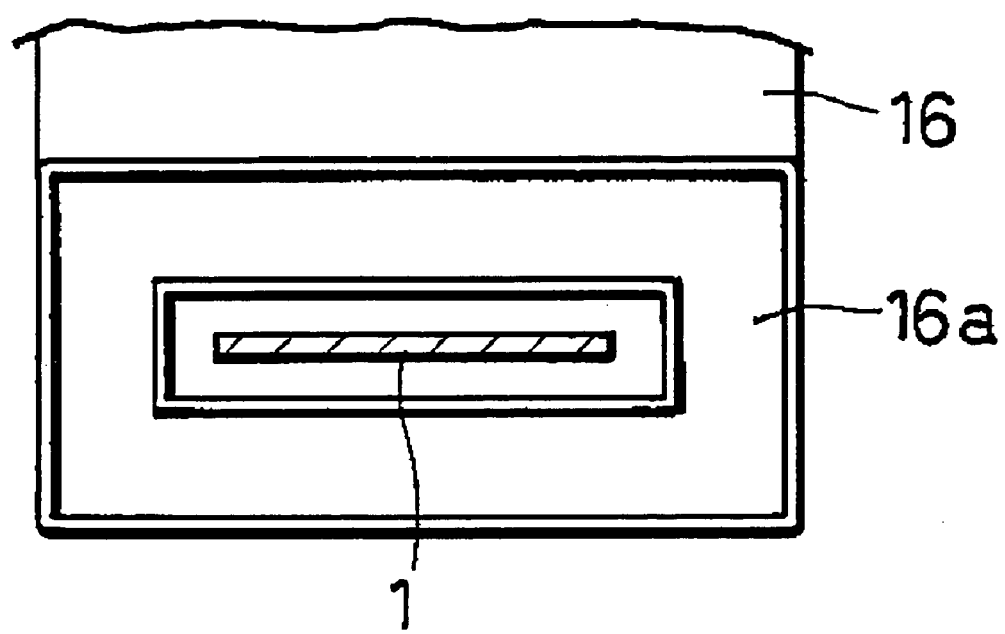
FIG. 5 is a schematic diagram illustrating another example of a sucking means (a suction nozzle).

In the mode shown in FIG. 3, the suction nozzle (16) having a suction port (16a) with a width larger than the tape width is arranged above the backcoat layer. The sucking means is not limited to this type, and it may be such a sucking means (16) as shown in FIG. 4, which has a suction port (16a) surrounding the surface and both edge portions of the backcoat layer (2) of the magnetic tape (1) (both end portions of the magnetic tape (1) along the tape lengthwise direction), viewed from a direction reverse to the tape-running direction. Alternatively, it may be such a sucking means (16) as shown in FIG. 5, which has a suction port (16a) enclosing a whole of a tape, viewed from a direction reverse to the tape-running direction. Further, although not shown herein, it may be such a sucking means that encloses a whole of the $CO_2$-sprayed region including a $CO_2$-spraying nozzle (15), but is arranged so as not to hinder the running of a magnetic tape.

Figure 6:
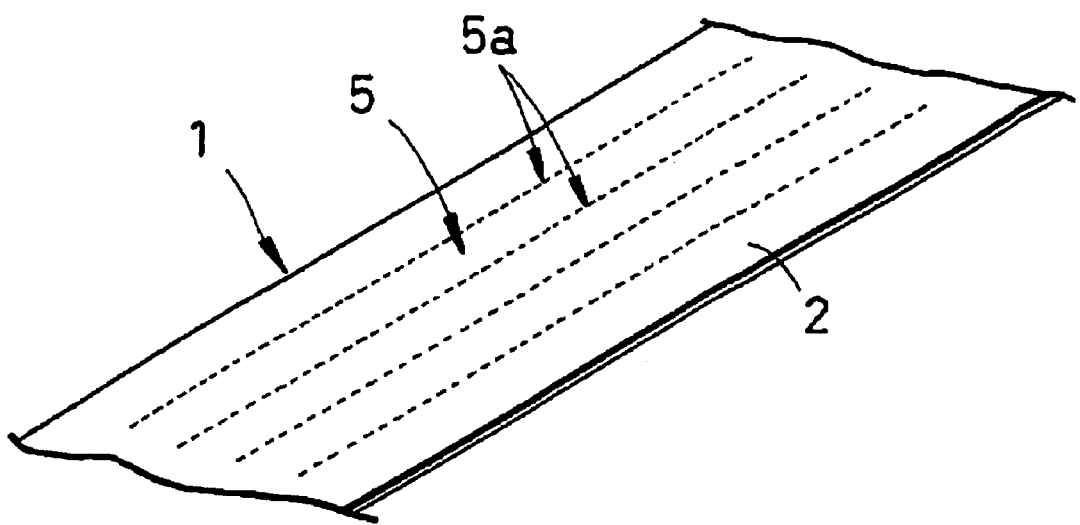
FIG. 6 is a perspective view of a magnetic tape, illustrating an example of servo patterns formed on the surface of the backcoat layer.

FIG. 6 shows an example of a pattern (a servo pattern) for arraying pits for optical servo, which is formed by irradiation with laser beams. The servo pattern (5) shown in FIG. 6 is formed on a magnetic tape (1) having a width of 12.64 mm (½ in.). In this example, four bands (5*a*) extending along the tape lengthwise direction are formed on the tape in the widthwise direction. The width of one band (5*a*) is about 0.4 mm. Microscopically, each one of the bands (5*a*) is composed of one row of pits for optical servo, arrayed along the tape lengthwise direction, and a plurality of such rows of the pits are arranged at intervals in the tape widthwise direction. The burnt particles resulting from the laser irradiation most abundantly adhere to the interiors of the pits within the servo pattern. Therefore, the most efficient spray nozzle (15) has a plurality of spray orifices (15*a*) which correspond to the bands (5*a*), one to one, as shown in FIG. 3. The spray nozzle (15) shown in FIG. 3 has four spray orifices (15*a*) corresponding to a pattern of four bands. The solid $CO_2$ (which has been in a liquid phase when sprayed, as described above) is uniformly sprayed from the spray orifices (15*a*), so that the pits forming the servo pattern (5) and their peripheries are surely cleaned.

Figure 7:
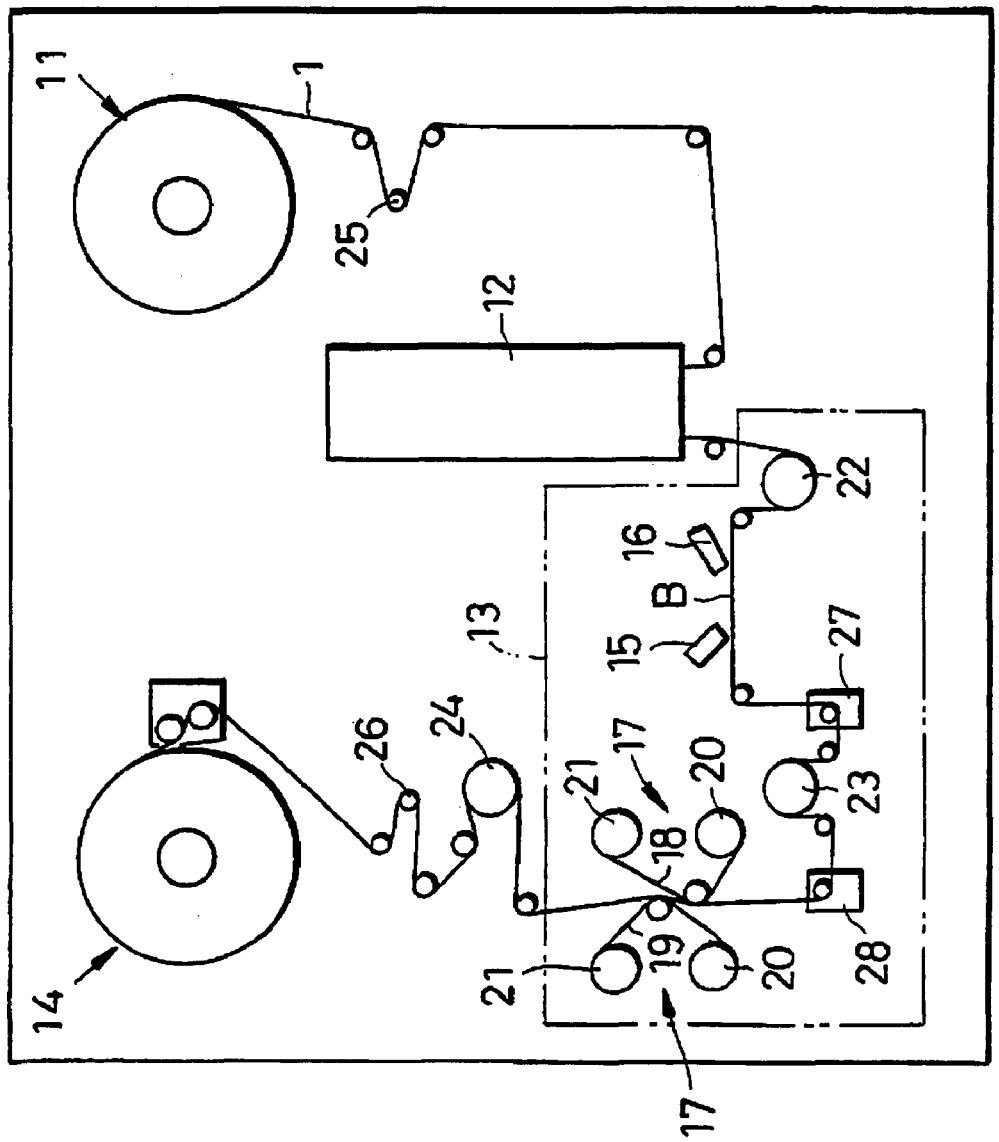
FIG. 7 is a schematic diagram illustrating the whole structure of an apparatus for forming and cleaning optical servo tracks, used in Examples of the present invention.

In another mode, solid $CO_2$ is sprayed from a $CO_2$-spraying nozzle inclined at a certain angle, toward a direction reverse to a magnetic tape which is running at a high speed (e.g., 10 m/sec.). In more particular, as shown in FIGS. 2, 3 and 7, the spray nozzle (15) inclined, for example, at an angle of 30 to 90°, preferably 30 to 60° relative to the surface of the backcoat layer (2), is arranged in the front of a portion of the surface of the backcoat layer onto which the solid $CO_2$ is sprayed (i.e., solid $CO_2$-receiving portion), when viewed from the magnetic tape-running direction A. The solid $CO_2$ is sprayed therefrom in a direction reverse to the tape-running direction A, and is struck to the $CO_2$-receiving portion. Thereby, the burnt residues adhered to the pits and their peripheries on the surface of the backcoat layer are blown off. Since this method makes it possible to increase the relative $CO_2$-spraying speed while the flow of $CO_2$ onto the pits for optical servo is being maintained, the cleaning effect can be improved.

To efficiently form a servo pattern, such an apparatus as described below is effectively used. That is, the apparatus can form pits for optical servo on the surface of the backcoat layer by irradiation with laser beams, while running several thousands meters of a reeled magnetic tape, and then, the apparatus cleans and wipes the surface of the backcoat layer, followed by rewinding the magnetic tape in good order. In the present invention, as the apparatus used is such an apparatus that forms and cleans optical servo tracks on a magnetic tape as shown in FIG. 7. This apparatus comprises a tape-feeding mechanism (11) for feeding a reeled magnetic tape (1) in a predetermined direction; an optical servo track-forming unit (12) for forming pits for optical servo on the surface of the backcoat layer of the fed magnetic tape (1) by irradiation with laser beams; a cleaning unit (13) for cleaning the surface of the backcoat layer after the formation of the pits; and a tape-winding mechanism (14) for winding the magnetic tape (1) after cleaning. The cleaning unit (13) comprises a $CO_2$-spraying section equipped with a spray nozzle (15) for spraying solid $CO_2$ onto the above pits and their peripheries; a sucking section equipped with a suction nozzle (16) for sucking burnt residues which are blown off by the spraying of the solid $CO_2$ and adhered to the pits and their peripheries; and a wiping section (17) for wiping the surfaces of the backcoat layer and the magnetic layer, for example, by means of tissue after the suction of the burnt residues.

In the above apparatus, a tension loss occurs in each of the optical servo track-forming unit (12), and the $CO_2$-spraying section and the wiping section in the cleaning unit (13), so that the magnetic tape may be held under a tension which exceeds an optimal tension (e.g., 70 to 200 g) to the tape. Accordingly, it is preferable to provide tension controlling means for individually controlling the tension of the magnetic tape in each of the unit and the sections. As will be described later in the part of Examples, the first to third suction rolls (22 to 24) are provided so as not to transmit the tension, while the values of tension detectors (27 and 28) which are provided in the respective units are feedback-controlled via a servo motor for rotating the suction rolls (22 to 24), so that the magnetic tape (1) is run under an optimal tension maintained.

Next, the cleaning method (2) using a raised fabric or the like is described.

A method for efficiently removing burnt residues, which are formed by irradiation with laser beams and adhered to the interiors of pits for optical servo and their peripheries, with a relatively simple apparatus has been researched. As a result, a method which comprises a step of allowing a raised fabric or a woven or nonwoven fabric having raising fibers thereon (preferably velvet) to contact with a magnetic tape running in the lengthwise direction is found to be very effective to remove the burnt residues only by running the magnetic tape once. According to the present invention, a raised fabric or a woven or nonwoven fabric having raising fibers thereon (preferably velvet) is allowed to contact with the surface of the backcoat layer of a magnetic tape which is being run at a high speed, for example, about 10 m/sec. so as to clean the surface of the backcoat layer. Thereby, the burnt residues (powder, etc.) adhered to the interiors of the pits for optical servo and their peripheries on the surface of the backcoat layer are efficiently removed.

Figure 9:
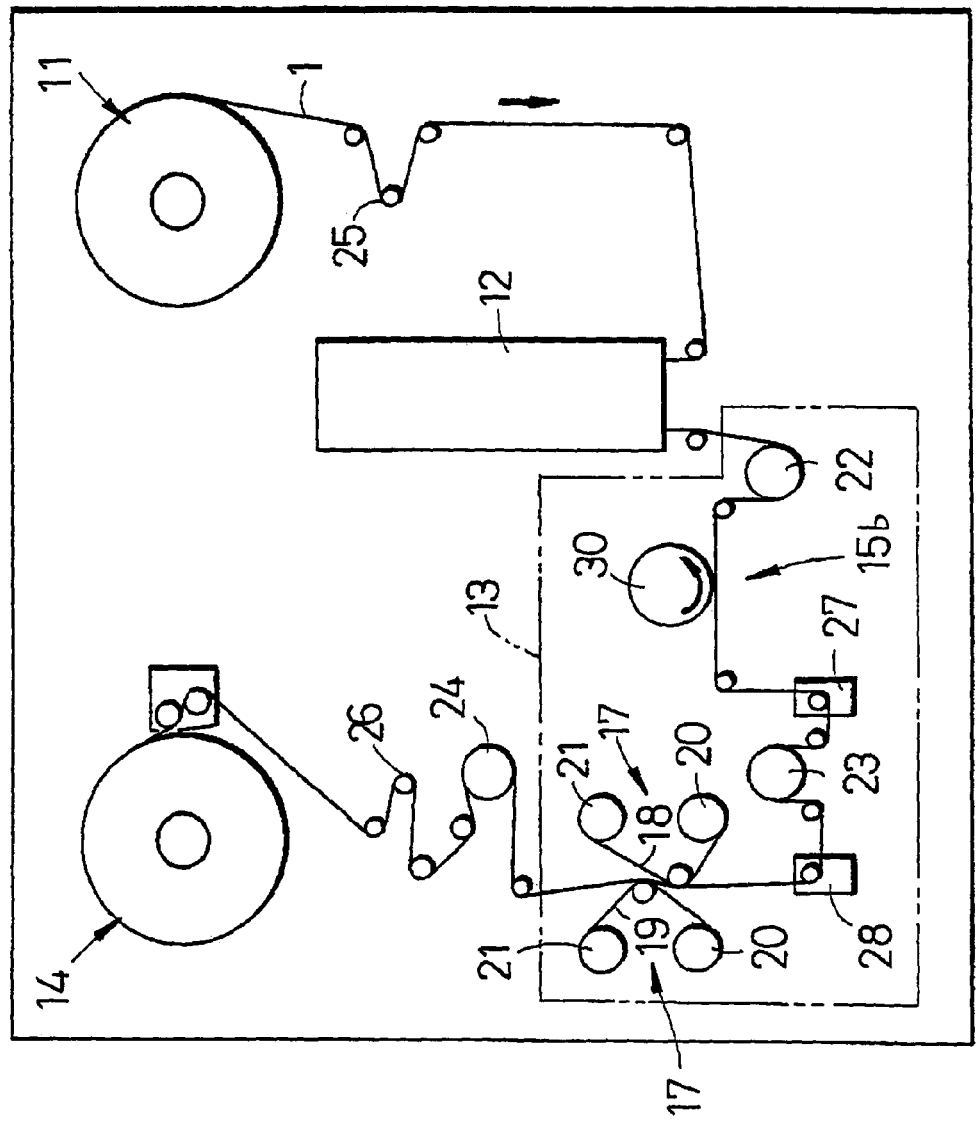
FIG. 9 is a schematic diagram illustration the construction of a whole of another apparatus for forming and cleaning optical servo tracks, used in Examples of the present invention.

To carry out the above method, an apparatus for forming and cleaning optical servo tracks on a magnetic tape as shown in FIG. 9 may be used in the present invention. The apparatus comprises a tape-feeding mechanism (11) for feeding a reeled magnetic tape (1) in a predetermined direction; an optical servo track-forming unit (12) for forming pits for optical servo on the surface of the backcoat layer of the fed magnetic tape (1) by irradiation with laser beams; a cleaning unit (13) for cleaning the surface of the backcoat layer after the formation of the pits; and a tape-winding mechanism (14) for winding the magnetic tape (1) after cleaning. The cleaning unit (13) comprises a contact-removing section (15*b*) for allowing a raised fabric or a woven or nonwoven fabric having raising fibers thereon, to contact with the surface of the backcoat layer so as to clean the same; and a wiping section (17) for wiping and removing unwanted particles adhered to the surface of the backcoat layer. This apparatus has high productivity, because the apparatus can perform the formation of pits for optical servo on the backcoat layer of a magnetic tape and the cleaning thereof by removing the burnt residues, on one line. In this case, tension-controlling means are separately provided in each of the optical servo track-forming unit, and the contact-removing section and the wiping section in the cleaning unit, so that the tension of the magnetic tape can be controlled in each of the unit and the sections by such tension-controlling means. By this arrangement, the productivity is improved.

The reason why the burnt residues in the pits and their peripheries on the surface of the backcoat layer are efficiently removed may be considered as follows. The raising fibers of the woven or nonwoven cloth have appropriate lengths and rigidity, and thus, such raising fibers enter the pits and efficiently rake out the burnt residues from the pits.

The diameter of a single fiber out of the raising fibers is preferably 0.5 to 10 μm, more preferably 1 to 8 μm, particularly 2 to 6 μm. If the diameter of such a single fiber is smaller than 0.5 μm, the rigidity (toughness) of the fiber is insufficient, and thus, such a fiber hardly rakes out the burnt residues. On the other hand, if the diameter of a single fiber exceeds 10 µm, such a fiber is hard to enter a pit.

The length of the single fiber is preferably 0.5 to 5 mm, more preferably 1 to 4 mm, particularly 1 to 3 mm. If the length of the single fiber is shorter than 0.5 mm, such a fiber hardly enters a pit. On the other hand, if the length of the single fiber exceeds 5 mm, the rigidity (toughness) of the fiber becomes poor, and thus hardly rakes out the burnt residue. It is also effective to split the tip end portion of a thick single fiber for use, so as to obtain a raking effect while maintaining the rigidity of the fiber.

The raising fibers are of at least one selected from natural fibers such as cotton and hemp, and synthesized fibers such as rayon and polyester. The fibers may be of a single kind or of a blended kind. The fibers may be of a single fiber or of a twisted yarn of at least two fibers.

Preferably, a material for such raising fibers contains at least cotton, since cotton has a proper rigidity (toughness) and thickness. For example, a blended fiber containing 30 to 70% of cotton and 70 to 30% of rayon can be used.

Figure 8:
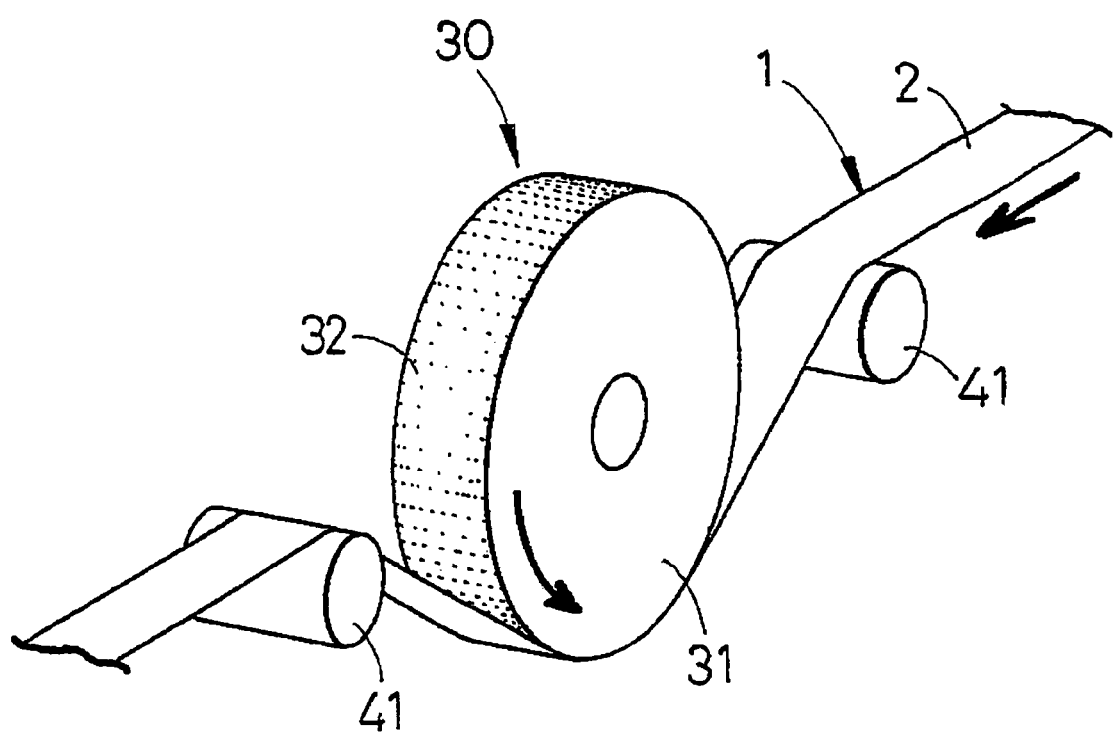
FIG. 8 is a perspective view of a contact-removing section and its periphery in an apparatus for forming and cleaning optical servo tracks, used in Examples of the present invention.

As already described with reference to FIG. 6, the fine particles formed as a result of the laser beam irradiation most abundantly adhere to the interiors of the pits of the servo pattern. As shown in FIG. 8, the raised fabric or the woven or nonwoven fabric (32) having raising fibers thereon may be wrapped around a rotary drum (31), and such a fabric may be replaced for each one reel of a magnetic tape (1) having a continuous length of several thousands meters. Otherwise, such a fabric may be continuously fed to the drum. Herein, the former type is employed, because the apparatus to be used is more simple than the latter type.

As shown in FIG. 8, the wrapped drum (30) (the rotary drum (31) wrapped at its outer circumference with the raised fabric (32)) is allowed to contact with the surface of the backcoat layer (2) of a magnetic tape (1) which is running at a high speed, for example, 10 m/sec., at a contact angle of 90 to 140°, while the wrapped drum (30) is being rotated at a certain velocity [30 to 50 rps (1,800 to 3,000 rpm)] in a direction reverse to the tape-running direction. The tension applied to the magnetic tape on the side of the inlet is set at 50 to 100 g, while the tension applied to the magnetic tape on the side of the outlet is set at 170 to 260 g, so that the tension of the magnetic tape is adjusted to 1.7 to 2.5 N. Thereby, the burnt residue-removing effect is improved.

If the contact angle is less than 90°, it is needed to reduce the tape-feeding speed, so that longer time is required to remove the burnt residues. In case where the treating time is short, the burnt residues drop from the pits of the backcoat layer and again adhere to the magnetic layer and the flat portion of the backcoat layer while recording/reproducing is repeatedly performed on or from the magnetic tape. As a result, the error rate increases, and the ratio of S/N of servo signals decreases. If the contact angle exceeds 140°, the components of the apparatus are arranged in a cramped state. In general, the contact angle is preferably at 90 to 120°.

The rotating velocity of the wrapped drum is preferably from 188.4 to 314 radian/sec. (1,800 to 3,000 rpm). If the rotating velocity is lower than 188.4 radian/sec. (1,800 rpm), it is needed to reduce the tape-feeding speed, so that longer time is required to remove the burnt residues. If the rotating velocity exceeds 314 radian/sec. (3,000 rpm), an expensive motor is needed. Alternatively, two or more wrapped drums may be arranged. However, in this case, the dimensions of the apparatus become larger.

To efficiently form a servo pattern, a magnetic tape with a continuous length of several thousands meters or longer wound onto a reel is being run, while pits for optical servo are being formed on the surface of the backcoat layer by irradiation with laser beams; the backcoat layer is subjected to a cleaning treatment and a wiping treatment; and then, the magnetic tape is again wound in good order. The apparatus to be used in the above steps may be an optical servo track-forming and -cleaning apparatus as shown in FIG. 9, which comprises a tape-feeding mechanism (11) for feeding a reeled magnetic tape (1) in a predetermined direction; an optical servo track-forming unit (12) for forming pits for optical servo on the surface of the backcoat layer of the fed magnetic tape (1) by irradiation with laser beams; a cleaning unit (13) for cleaning the surface of the backcoat layer after the formation of the pits; and a tape-winding mechanism (14) for winding the magnetic tape (1) after cleaning. The cleaning unit (13) comprises a contact-removing section (15*b*) for allowing a raised fabric or a woven or nonwoven fabric having raising fibers thereon, to contact with the surface of the backcoat layer so as to clean the same; and a wiping section (17) for wiping and removing unwanted particles adhered to the surface of the backcoat layer, using, for example, a tissue. However, in the apparatus of this type, a tension loss occurs in each of the optical servo track-forming unit (12), and the contact-removing section (15*b*) and the wiping section (17) in the cleaning unit (13), so that the tension applied to the tape sometimes exceeds an optimal tension to the tape (e.g., 70 to 200 g). To overcome this problem, it is preferable to provide tension-controlling means in each of the unit and the sections so as to separately control the tension of the magnetic tape in each unit or section. This is described in more detail. As will be described later in the part of Examples, the first to third suction rolls (22 to 24) are provided so as not to transmit the tension, and the values of tension detectors (27 and 28) provided in the respective units are feedback-controlled via a servo motor for rotating the suction rolls (22 to 24), so that the magnetic tape (1) can be run under an optimal tension maintained.

Hereinafter, the respective elements of a magnetic recording medium are described.

<Nonmagnetic Support>

The thickness of a nonmagnetic support is preferably 7.0 µm or less, more preferably from 2.0 to 7.0 µm. When the thickness of the nonmagnetic support is less than 2 µm, it is difficult to form a film. Furthermore, the strength of the resultant magnetic tape decreases. When the thickness of the nonmagnetic support exceeds 7.0 µm, the total thickness of the magnetic tape increases so that the recording capacity per one reel of the magnetic tape decreases.

The Young's modulus of the nonmagnetic support in the lengthwise direction depends on the thickness of the support, and is usually at least 5.07 GPa (500 kg/mm$^2$). When the thickness of the support is 5.0 µm or less, the Young's modulus is preferable at least 10.13 GPa (1,000 kg/mm$^2$). If the Young's modulus of the nonmagnetic support is lower than 5.09 GPa (500 kg/mm$^2$), the strength of the magnetic tape becomes poor, or the running of the magnetic tape becomes unstable.

The ratio of Young's modulus MD in the lengthwise direction to Young's modulus TD in the widthwise direction (MD/TD) of the nonmagnetic support is preferably from 1.0 to 1.8, more preferably from 1.1 to 1.7. When the ratio of MD/TD is within this range, the head touch is improved.

Examples of such a nonmagnetic support include a polyethylene terephthalate film, a polyethylene naphthalate film, an aromatic polyamide film, an aromatic polyimide film, etc.

<Primer Layer>

A primer layer may be formed between a nonmagnetic support and a magnetic layer. The thickness of the primer layer is preferably from 0.3 to 3.0 µm, more preferably from 0.3 to 2.5 µm, particularly 0.3 to 2.0 µm. When the thickness of the primer layer is less than 0.3 µm, the durability of the magnetic tape may become poor. When the thickness of the primer layer exceeds 3.0 µm, the effect to improve the durability of the magnetic tape is saturated, and the total thickness of the magnetic tape increases. Accordingly, the length of the tape per one reel decreases, so that the recording capacity decreases.

The primer layer may contain carbon black (CB) to improve the conductivity, and contain nonmagnetic particles to control the viscosity of a paint and the stiffness of the magnetic tape. Examples of the nonmagnetic particles to be contained in the primer layer include titanium oxide, iron oxide, alumina, etc. The addition of iron oxide alone, or a mixture of iron oxide and alumina is preferable.

The surface roughness of the magnetic layer, which is formed on the primer layer by a wet-on-wet method, can be reduced, when the primer layer contains 15 to 35 wt. % of carbon black having a particle size of 10 to 100 nm, 35 to 83 wt. % of nonmagnetic iron oxide having a major axis length of 0.05 to 0.20 dun and a minor axis length of 5 to 200 nm, and optionally 0 to 20 wt. % of alumina having a particle size of 10 to 100 nm, based on the weight of the total inorganic particles contained in the primer layer.

The nonmagnetic iron oxide particles may be of a needle shape, or particulate or random shape. When particulate or random nonmagnetic iron oxide is used, its particle size is preferably from 5 to 200 nm.

The present invention does not avoid the addition of large size carbon black (CB) having a particle size of 100 nm or more, provided that the surface smoothness is not impaired. In this case, preferably, the sum of the small size carbon black (CB) and the large size carbon black (CB) is within the above range.

Examples of carbon black (CB) to be added to the primer layer are acetylene black, furnace black, thermal black, etc. Such carbon black usually has a particle size of 5 to 200 nm, preferably 10 to 100 nm. When the particle size of carbon black is less than 10 nm, it may be difficult to disperse the carbon black particles, since carbon black has a structure. When the particle size of carbon black exceeds 100 nm, the surface smoothness of the primer layer degrades.

The amount of carbon black to be contained in the primer layer varies depending on the particle size of carbon black, and it is preferably from 15 to 35 wt. %. When the amount of carbon black is less than 15 wt. %, the conductivity may not be sufficiently improved. When the amount of carbon black exceeds 35 wt. %, the effects of the addition of carbon black may saturate. More preferably, carbon black having a particle size of 15 to 80 nm is used in an amount of 15 to 35 wt. %, and particularly, carbon black having a particle size of 20 to 50 nm is used in an amount of 20 to 30 wt. %. When carbon black having the above particle size is used in the above-defined amount, the electrical resistance is decreased, and the feeding irregularity is lessened.

The nonmagnetic iron oxide to be added to the primer layer preferably has a major axis length of 0.05 to 0.20 µm and a minor axis length (particle diameter) of 5 to 200 nm in the case of the needle-shape particles, or it has a particle size of 5 to 200 nm, preferably 5 to 150 nm, more preferably 5 to 100 nm, in the case of the particulate or random shape particles. In particular, the needle-shape iron oxide particles are preferable, since the orientation of the magnetic layer can be improved. The amount of the nonmagnetic iron oxide to be added to the primer layer is preferably from 35 to 83 wt. %, more preferably from 40 to 80 wt. %. When the particle size of the nonmagnetic iron oxide (the minor axis length in case of the needle shape particle) is less than 5 nm, the iron oxide particles may not be uniformly dispersed. When the particle size exceeds 200 nm, the unevenness of the interface between the primer layer and the magnetic layer may increase. When the amount of the nonmagnetic iron oxide is less than 35 wt. %, the effect to improve the strength of the primer layer is poor. When the amount of the iron oxide exceeds 83 wt. %, the strength of the primer layer may rather decrease.

The primer layer may contain alumina in addition to iron oxide. The particle size of alumina is preferably from 10 to 100 nm, more preferably from 20 to 100 nm, particularly from 30 to 100 nm. When the particle size of alumina is less than 10 nm, the alumina particles may not be uniformly dispersed. When the particle size of alumina exceeds 100 nm, the unevenness of the interface between the primer layer and the magnetic layer tends to increase. The amount of alumina to be added to the primer layer is usually from 0 to 20 wt. %, preferably from 2 to 10 wt. %.

<Lubricant>

A coating layer comprising the primer layer and the magnetic layer may contain a lubricant having a different function. The coefficient of dynamic friction of the magnetic tape against the guide of the feeding system or the like can be decreased, for example, when the primer layer contains 0.5 to 4.0 wt. % of a higher fatty acid and 0.2 to 3.0 wt. % of a higher fatty acid ester, based on the weight of the entire powder components in the primer layer. When the amount of the higher fatty acid is less than 0.5 wt. %, the effect to decrease the coefficient of dynamic friction is insufficient. When the amount of the higher fatty acid exceeds 4.0 wt. %, the primer layer may be plasticized and thus the toughness of the primer layer may be lost. When the amount of the higher fatty acid ester is less than 0.5 wt. %, the effect to decrease the coefficient of friction is insufficient. When the amount of the higher fatty acid ester exceeds 3.0 wt. %, the amount of the higher fatty acid ester which migrates to the magnetic layer may become too large, so that the magnetic tape may stick to the guide or the like of the feeding system.

As the fatty acid, higher fatty acids such as lauric acid, myristic acid, palmitic acid, stearic acid, behenic acid, oleic acid, linoleic acid, etc. can be used. As the fatty acid ester, butyl stearate, octyl stearate, amyl stearate, isooctyl stearate, octyl myristate, butoxyethyl stearate, anhydrous sorbitan monostearate, anhydrous sorbitan distearate, anhydrous sorbitan tristearate, etc. can be used.

The coefficient of dynamic friction of the magnetic tape against the guide roller of the feeding system or the slider of the MR head can be decreased, when the magnetic layer contains 0.2 to 3.0 wt. % of a fatty acid amide and 0.2 to 3.0 wt. % of a higher fatty acid ester, based on the weight of the ferromagnetic powder. When the amount of the fatty acid amide is less than 0.2 wt. %, the coefficient of dynamic friction between the head slider and the magnetic layer tends to increase. When the amount of the fatty acid amide exceeds 3.0 wt. %, the fatty acid amide bleeds out and causes a defect such as dropout.

When the amount of the higher fatty acid ester is less than 0.2 wt. %, the coefficient of dynamic friction is hardly decreased. When the amount of the higher fatty acid ester exceeds 3.0 wt. %, the magnetic tape sticks to the guide of the feeding system.

As the fatty acid amide, the amides of the above higher fatty acids such as palmitic acid, stearic acid and the like can be used.

The intermigration between the lubricant of the magnetic layer and the lubricant of the primer layer may be allowed.

The coefficient of dynamic friction ($\mu_{mSL}$) between the magnetic layer and the slider of the MR head is preferably 0.30 or less, more preferably 0.25 or less. When this coefficient of dynamic friction exceeds 0.30, the spacing loss tends to arise due to the contamination on the slider. The coefficient of dynamic friction of less than 0.10 is hardly realized.

The coefficient of dynamic friction ($\mu_{mSUS}$) between the magnetic layer and SUS is preferably from 0.10 to 0.25, more preferably from 0.12 to 0.20. When this coefficient of dynamic friction is less than 0.10, the tape is so slidable on the guide portion that the tape cannot be stably run. When this coefficient of dynamic friction exceeds 0.25, the guide rollers may easily be contaminated.

The ratio of [($\mu_{mSL}$)/($\mu_{mSUS}$)] is preferably from 0.7 to 1.3, more preferably from 0.8 to 1.2. In this preferred range, dislocation from a track (off-track) because of the tape-meandering becomes smaller.

<Magnetic Layer>

The thickness of a magnetic layer is usually 0.3 µm or less, preferably from 0.01 to 0.3 µm, more preferably from 0.01 to 0.25 µm, particularly from 0.01 to 0.10 µm.

When the thickness of the magnetic layer is less than 0.01 µm, it is difficult to form an uniform magnetic layer. When the thickness of the magnetic layer exceeds 0.3 µm, the reproducing output may decrease due to the thickness loss, or the product of the residual magnetic flux density and the thickness becomes too large, so that the reproducing output tends to be skewed due to the saturation of the MR head.

The coercive force of the magnetic layer is preferably from 120 to 320 kA/m, more preferably from 140 to 320 kA/m. When the coercive force of the magnetic layer is less than 120 kA/m, less recording wavelength causes output decrease due to the demagnetizing field demagnetization, when the recording wavelength is shortened. When the coercive force exceeds 320 kA/m, the recording with the magnetic head may become difficult.

The product of the residual magnetic flux density in the lengthwise direction and the thickness is preferably from 0.0018 to 0.06 µTm, more preferably from 0.0036 to 0.050 µTm. When this product is less than 0.0018 µTm, the reproducing output with the MR head may be low. When this product exceeds 0.06 µTm, the reproducing output with the MR head tends to be skewed.

The contact between the magnetic tape and the MR head can be improved, and the reproducing output with the MR head increases, under the following conditions: the average surface roughness Ra of the magnetic layer is from 3.2 nm to 1.0 nm; and the value of ($P_1-P_0$) is from 30 nm to 10 nm, and the value of ($P_1-P_{20}$), 5 nm or less, wherein P is the center value of the unevenness of the magnetic layer; $P_1$ is the height of the highest projection of the magnetic layer; and $P_{20}$ is the height of the 20th highest projection.

As the magnetic powder to be added to the magnetic layer, ferromagnetic iron metal powder or hexagonal barium ferrite powder may be used. The coercive force of the ferromagnetic iron metal powder or hexagonal barium ferrite powder is preferably from 120 to 320 kA/m. The saturation magnetization is preferably from 120 to 200 A·m²/kg (120 to 200 emu/g), more preferably from 130 to 180 A·m²/kg (130 to 180 emu/g) in case of the ferromagnetic iron metal powder. It is preferably from 50 to 70 A·m²/kg (50 to 70 emu/g) in case of the hexagonal barium ferrite powder.

The magnetic characteristics of the magnetic layer and the ferromagnetic powder are measured with a vibration sample magnetometer in an external magnetic field of 1.28 MA/m (16 kOe).

An average major axis length of the ferromagnetic iron metal powder is preferably from 0.03 to 0.2 µm, more preferably from 0.03 to 0.18 µm, particularly from 0.03 to 0.10 µm. When the average major axis length is less than 0.03 µm, the dispersion of the powder in the paint is difficult since the agglomeration force of the magnetic powder increases. When the average major axis length exceeds 0.2 µm, the coercive force decreases, or the particle noise due to the particle size increases. For the same reason, the plate size of the hexagonal barium ferrite powder is preferably from 5 to 200 nm, more preferably 10 to 100 nm, particularly 10 to 50 nm.

The average major axis length and the particle size are obtained by actually measuring the particle sizes on a photograph taken with a scanning electron microscope (SEM) and averaging the measured values of 100 particles.

The BET specific surface area of the ferromagnetic iron metal powder is preferably at least 35 m²/g, more preferably at least 40 m²/g, particularly at least 50 m²/g as the best. The BET specific surface area of the hexagonal barium ferrite powder is preferably 1 to 100 m²/g.

A binder to be contained in the primer layer or the magnetic layer may be a combination of a polyurethane resin and at least one resin selected from the group consisting of a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, nitrocellulose, and the like. Among them, a mixture of a vinyl chloride-hydroxyl group-containing alkyl acrylate copolymer resin and a polyurethane resin is preferably used. Examples of the polyurethane resin include polyesterpolyurethane, polyetherpolyurethane, polyetherpolyesterpolyurethane, polycarbonatepolyurethane, polyestrepolycarbonate-polyurethane, etc.

Preferably, a binder resin such as an urethane resin formed from a polymer having a functional group such as COOH, $SO_3M$, $OSO_2M$, $P=O(OM)_3$, $O-P=O(OM)_2$ [wherein M is a hydrogen atom, an alkali metal ion or an amine salt], OH, $NR^1R^2$, $N^+R^3R^4R^5$ [wherein $R^1$, $R^2$, $R^3$, $R^4$ and $R^5$ are each a hydrogen atom or a hydrocarbon group], or an epoxy group is used. The reason why such a binder is used is that the dispersibility of the magnetic powder or the like is improved. When two or more resins are used in combination, it is preferable that the polarities of the functional groups of the resins are the same. In particular, the combination of resins both having —$SO_3M$ groups is preferable.

The binder is used in an amount of 7 to 50 parts by weight, preferably from 10 to 35 parts by weight, based on 100 parts by weight of the ferromagnetic powder. In particular, the combination of 5 to 30 parts by weight of a vinyl chloride-based resin and 2 to 20 parts by weight of the polyurethane resin is best.

It is preferable to use a thermally curable crosslinking agent, which bonds with the functional groups in the binder to crosslink the binder. As the crosslinking agent, the following are preferably used: tolylene diisocyanate, hexamethylene diisocyanate and isophorone diisocyanate; reaction products of these isocyanates with compounds having plural hydroxyl groups such as trimethylolpropane; condensation products of these isocyanates, and the like.

The crosslinking agent is used in an amount of 10 to 50 parts by weight, preferably 10 to 35 parts by weight, based on 100 parts by weight of the binder. When the amount of the crosslinking agent to be contained in the magnetic layer is about 50% (for example, 30 to 60%) of that contained in the primer layer, the coefficient of dynamic friction of the magnetic layer against the slider of the MR head is preferably decreased. When the amount of the crosslinking agent is less than 30%, the film strength of the magnetic layer tends to decrease, while, when it exceeds 60%, the LRT treatment conditions (the conditions for the wiping treatment using tissue) should be selected severely so as to decrease the coefficient of dynamic friction against the slider, which leads to the increase of cost.

The magnetic layer may contain conventional carbon black (CB) to improve the conductivity and the surface lubricity. As carbon black, acetylene black, furnace black, thermal black, etc. may be used. Carbon black having a particle size of 5 to 200 nm is generally used, and carbon black having a particle size of 10 to 100 nm is preferable. When the particle size of carbon black is less than 5 nm, the dispersion of carbon black particles is difficult. When the particle size of carbon black exceeds 200 nm, a large amount of carbon black should be added. In either case, the surface of the magnetic layer becomes coarse and thus the output tends to decrease.

The amount of carbon black is preferably from 0.2 to 5 wt. %, more preferably from 0.5 to 4 wt. %, based on the weight of the ferromagnetic powder. When the amount of carbon black is less than 0.2 wt. %, the effect of the addition of carbon black is insufficient. When the amount of carbon black exceeds 5 wt. %, the surface of the magnetic layer tends to be rough.

<Backcoat Layer>

The thickness of a backcoat layer is preferably from 0.25 to 0.8 μm, more preferably from 0.4 to 0.8 μm, particularly from 0.4 to 0.6 μm. When the thickness of the backcoat layer is less than 0.25 μm, the conditions for forming pits for optical servo (the power of the laser, etc.) are hardly controlled. When the thickness of the backcoat layer exceeds 0.8 μm, the total thickness of the magnetic tape increases, so that the recording capacity of the tape per one reel decreases.

The coefficient of dynamic friction ($\mu_{Bsus}$) between the backcoat layer and SUS is preferably from 0.10 to 0.30, more preferably from 0.10 to 0.25. When this coefficient of dynamic friction is less than 0.10, the magnetic tape becomes excessively slidable on the guide rollers, so that the running of the tape becomes unstable. When this coefficient of dynamic friction exceeds 0.30, the guide rollers tend to be contaminated. The ratio of $[(\mu_{mSL})/(\mu_{BSUS})]$ is preferably from 0.8 to 1.5, more preferably from 0.9 to 1.4. Within this range, dislocation from a track (off-track) on the magnetic tape due to the tape-meandering becomes smaller.

The average of the reflectance on the flat portion of the backcoat layer is preferably 8.5% or more, more preferably 9.0% or more, particularly 10% or more. When the average of the reflectance is less than 8.5%, servo signals (S) become low, which causes tracking failure. The practical upper limit of the average of the reflectance of a backcoat layer is usually 15%. When the average of the reflectance of the backcoat layer exceeds 15%, the durability generally may degrade in case of an uniform backcoat layer. In case where a backcoat layer whose average of the reflectance exceeds 15% is used, the average of the reflectance on the flat portion other than the portion where pits for optical servo are formed is controlled below 15% so that the durability of the backcoat layer cannot degrade.

It is preferable that the average of the reflectance is controlled above 8.5%, and also that the rate of fluctuation of reflectance on the flat portion depending on a site of the magnetic tape (a position on the magnetic tape), determined by the following equation, is controlled below 10%, preferably below 5%, more preferably below 3%, particularly 0% as the best:

(Maximum of absolute value of fluctuation from average of reflectance)×100/(Average of Reflectance)

When the rate of fluctuation exceeds 10%, the S/N of servo signals decreases, which induces a tracking error.

To evaluate the rate of fluctuation of reflectance depending on a site of a magnetic tape, the fluctuation of reflectance per 40 mm length of the magnetic tape is investigated. This is because the fluctuation of reflectance per 40 mm length of the magnetic tape is substantially equal to the fluctuation of reflectance over the entire length of the magnetic tape.

To control the average of the reflectance on the flat portion above 8.5% and simultaneously to control the rate of fluctuation of reflectance on the flat portion, depending on a site of the magnetic tape, below 10%, the content of the nonmagnetic powder in the backcoat layer, calculated by the following equation, is controlled to 50 wt. % or more:

(Weight of nonmagnetic powder)×100/(Weight of nonmagnetic powder+Weight of binder), and also the surface roughness Ra of the flat portion of the backcoat layer, measured with an AFM, is controlled to 30 nm or less; and the half width of the fluctuation of the surface roughness Ra depending on a site of the magnetic tape is controlled to 5 nm or less. The surface roughness Ra of the flat portion is preferably 10 nm or more, more preferably 20 nm or more. When the Ra is less than 10 nm, the durability of the magnetic tape tends to degrade. Therefore, it is necessary that, in case where a backcoat layer having a surface roughness Ra of less than 10 nm at the flat portion is used, the flat portion of the backcoat layer, other than the pit-formed portion, should have a surface roughness Ra of 10 nm or more. In this regard, when the surface roughness Ra is measured at 100 points per an area of 40 μm×40 m of a magnetic tape with the AFM, the results are substantially equal to the Ra per a whole length of the magnetic tape and the fluctuation of Ra of the same.

As described above, the reflectance of the flat portion of the backcoat layer increases, when the content of the nonmagnetic powder is 50 wt. % or more, and when the surface thereof is smooth. However, if the content of the nonmagnetic powder in the backcoat layer is 60 wt. % or more, it is difficult to control the surface roughness Ra of the flat portion to less than 30 nm. Thus, when the surface roughness Ra of the flat portion is adjusted to 30 nm or less by making the calendering conditions severe, the resultant backcoat layer tends to have a poor durability. For such reasons, the content of the nonmagnetic powder in the backcoat layer is practically from 50 to 60 wt. %, preferably from 50 to 58 wt. %, more preferably from 50 to 56 wt. %, particularly from 53 to 56 wt. %.

Preferably, the proportion of carbon black in the nonmagnetic powder is 80 wt. % or more, because the pits for optical servo can be easily formed by irradiation with laser beams. More preferably, the proportion of carbon black is 85 wt. % or more. The addition of 20 wt. % or less of iron oxide (e.g., red iron oxide) in combination with carbon black is more preferable, because the strength of the backcoat layer is enhanced.

As carbon black (CB) to be contained in the backcoat layer, acetylene black, furnace black, thermal black, etc. can be used. In general, carbon black with a small particle size and carbon black with a large particle size are used. The particle size of small particle size carbon black is usually from 5 to 200 nm, preferably from 10 to 100 nm. When the particle size of small particle size carbon black is less than 10 nm, it is difficult to disperse the carbon black particles. When the particle size of small particle size carbon black exceeds 100 nm, a large amount of carbon black should be added. In either case, the surface roughness Ra of the backcoat layer is 30 nm or more, and the reflectance on the flat portion decreases.

When the large particle size black carbon having a particle size of 200 to 400 nm is used in an amount of 5 to 15 wt. % of the whole amount of carbon black (total of the small particle size carbon black and the large particle size carbon black), the surface of the backcoat is not roughened and the effect to increase the tape-running performance is increased. When the amount of the large particle size black carbon is less than 5 wt. %, the durability-improving effect is poor. When it exceeds 15 wt. %, the reflectance on the flat portion largely fluctuates. The total amount of the small particle size carbon black and the large particle size carbon black is preferably from 80 to 100 wt. %, more preferably from 85 to 100 wt. %, based on the weight of nonmagnetic powder. The surface roughness Ra of the backcoat layer, measured with the AFM, is preferably 30 nm or less, and it is generally 10 nm or more, as described above.

To enhance the strength of the backcoat layer, it is preferable to add 20 wt. % or less of inorganic additives such as iron oxide (e.g., iron oxide and alumina which are usually added to the backcoat layer) in total, based on the weight of the inorganic powder. The addition amount of the inorganic additives is preferably from 2 to 20 wt. %, more preferably 5 to 15 wt. %. When this amount is less than 2 wt. %, the strength of the backcoat layer is not effectively improved. If it exceeds 20 wt. %, the formation of pits for optical servo by irradiation with laser beams becomes difficult. In this regard, an oxide mainly containing iron oxide is preferably used, while iron oxide may be added together with alumina at the same time. In the latter case, the addition amount of alumina is preferably 20 wt. % or less based on the weight of the iron oxide. When the addition amount of alumina exceeds 20 wt. % based on the weight of the iron oxide, it is needed to strictly select the conditions for cleaning the burnt residues. The particle size of iron oxide (particles) is preferably from 0.05 to 0.4 μm, more preferably from 0.07 to 0.35 μm. When the particle size of iron oxide is less than 0.05 μm, the strength of the backcoat layer is hardly improved. On the other hand, when it exceeds 0.4 μm, the reflectance on the flat portion largely fluctuates.

The binder to be contained in the backcoat layer may comprise the same resin as used in the magnetic layer and the primer layer. Among these resins, the combination of a cellulose resin and a polyurethane resin is preferably used so as to decrease the coefficient of friction and to improve the tape-running performance.

The amount of the binder in the backcoat layer is usually from 40 to 150 parts by weight, preferably from 50 to 120 parts by weight, more preferably from 50 to 110 parts by weight, particularly from 50 to 100 parts by weight, based on the total 100 parts by weight of carbon black and the inorganic nonmagnetic powder in the backcoat layer. When the amount of the binder is less than 50 parts by weight, the strength of the backcoat layer is insufficient. When the amount of the binder exceeds 120 parts by weight, the coefficient of friction increases. Preferably, 30 to 70 parts by weight of a cellulose resin and 20 to 50 parts by weight of a polyurethane resin are used. To cure the binder, a crosslinking agent such as a polyisocyanate compound is preferably used.

The crosslinking agent to be contained in the backcoat layer may be the same as those used in the magnetic layer and the primer layer. The amount of the crosslinking agent is usually from 10 to 50 parts by weight, preferably from 10 to 35 parts by weight, more preferably from 10 to 30 parts by weight, based on 100 parts by weight of the binder. When the amount of the crosslinking agent is less than 10 parts by weight, the film strength of the backcoat layer tends to decrease. When the amount of the crosslinking agent exceeds 50 parts by weight, the coefficient of dynamic friction of the backcoat layer against SUS increases.

<LRT (Lapping/Rotary/Tissue) Treatment>

The magnetic layer is subjected to a LRT treatment so as to optimize the surface smoothness, the coefficient of dynamic friction against the slider of the MR head and the cylinder material, the surface roughness and the surface shape. Thus, the running performance of the magnetic tape and the reproducing output with the MR head are improved, and the spacing loss is reduced.

The respective steps of the LRT treatment are described below.

(1) Lapping:

An abrasive tape (lapping tape) is moved by a rotary roll at a constant rate (standard: 14.4 cm/min.) in a direction opposite to the tape-feeding direction (standard: 400 m/min.), and is allowed to contact with the surface of the magnetic layer of the magnetic tape while being pressed under the guide block. In this step, the magnetic layer is polished while the unwinding tension of the magnetic tape and the tension of the lapping tape being maintained constant (standard: 100 g and 250 g, respectively).

The abrasive tape (lapping tape) (3) used in this step may be an abrasive tape (lapping tape) with fine abrasive particles such as M20000, WA10000 or K10000. It is possible to use an abrasive wheel (lapping wheel) in place of or in combination with the abrasive tape (lapping tape). In case where frequent replacement is needed, the abrasive tape (lapping tape) alone is used.

(2) Rotary Treatment

A rotary wheel having air-bleeding grooves (standard: width of 1 inch (25.4 mm); diameter of 60 mmϕ); air-bleeding groove width of 2 mm; groove angle of 45 degrees, manufactured by KYOWA SEIKO Co., Ltd.) is rotated at a constant revolution rate (usually 200 to 3,000 rpm; standard: 1,100 rpm) in a direction opposite to the feeding direction of the magnetic layer, while being allowed to be in contact with the magnetic layer of the magnetic tape at a constant contact angle (standard: 90 degrees). Thus, the surface of the magnetic layer is treated.

(3) Tissue Treatment

Tissue (a woven fabric, for example, Traysee manufactured by Toray) is fed at a constant rate (standard: 14.0 mm/min.) by rotary rods, in a direction opposite to the feeding direction of the magnetic tape, so as to clean the surfaces of the backcoat layer and the magnetic layer of the magnetic tape, respectively.

A cassette tape including a magnetic tape of the present invention shows a high S/N with respect to optical servo signals, and thus is excellent in servo tracking performance. Therefore, such a cassette tape can be used as a backup tape for a hard disc drive, with high reliability.

EXAMPLES

The present invention will be explained in detail by way of the following Examples, which do not limit the scope of the invention in any way. In Examples and Comparative Examples, "parts" are "parts by weight", unless otherwise specified.

Example 1

<Components of a Paint for a Primer Layer>

| (1) | |
|---|---|
| Iron oxide powder (particle size: 0.11 × 0.02 μm) | 68 parts |
| α-Alumina (particle size: 0.07 μm) | 8 parts |
| Carbon black (particle size: 25 nm; oil absorption: 55 g/cc) | 24 parts |
| Stearic acid | 2.0 parts |
| Vinyl chloride-hydroxypropyl acrylate copolymer (—$SO_3Na$ group content: $0.7 \times 10^{-4}$ eq./g) | 8.8 parts |
| Polyesterpoyurethane resin (Tg: 40° C., —$SO_3Na$ group content: $1 \times 10^{-4}$ eq./g) | 4.4 parts |
| Cyclohexanone | 25 parts |
| Methyl ethyl ketone | 40 parts |
| Toluene | 10 parts |
| (2) | |
| Butyl stearate | 1 part |
| Cyclohexanone | 70 parts |
| Methyl ethyl ketone | 50 parts |
| Toluene | 20 parts |
| (3) | |
| Polyisocyanate (Colonate L manufactured by Nippon Polyurethane) | 4.4 parts |
| Cyclohexanone | 10 parts |
| Methyl ethyl ketone | 15 parts |
| Toluene | 10 parts |

<Components of a Paint for a Magnetic Layer>

| (A) | |
|---|---|
| Ferromagnetic iron metal powder (Co/Fe: 30 atomic %, Y/(Fe + Co): 3 atomic %, Al/(Fe + Co): 5 wt. %, Ca/Fe: 0; σs: 155 A·$m^2$/kg, Hc: 188.2 kA/m, pH: 9.4, major axis length: 0.10 μm) | 100 parts |
| Vinyl chloride-hydroxypropyl acrylate copolymer (—$SO_3Na$ group content: $0.7 \times 10^{-4}$ eq./g) | 12.3 parts |
| Polyesterpolyurethane resin (—$SO_3Na$ group content: $1 \times 10^{-4}$ eq./g) | 5.5 parts |
| α-Alumina (particle size: 0.12 μm) | 8 parts |
| α-Alumina (particle size: 0.07 μm) | 2 parts |
| Carbon black (particle size: 75 nm; DBP oil absorption: 72 cc/100 g) | 1.0 part |
| Methyl acid phosphate | 2 parts |
| Palmitic acid amide | 1.5 parts |
| n-Butyl stearate | 1.0 part |
| Tetrahydrofuran | 65 parts |
| Methyl ethyl ketone | 245 parts |
| Toluene | 85 parts |
| (B) | |
| Polyisocyanate (Colonate L manufactured by Nippon Polyurethane Kogyo K.K.) | 2.0 parts |
| Cyclohexanone | 167 parts |

A paint for a primer layer was prepared by kneading the components of Group (1) with a kneader, adding the components of Group (2) to the mixture, and stirring them, dispersing the mixture in a sand mill in residence time of 60 minutes, and adding the components of Group (3), followed by stirring and filtering the mixture.

Separately, a paint for a magnetic layer was prepared by kneading the components of Group (A) with a kneader, dispersing the mixture in a sand mill in residence time of 45 minutes, and adding the components of Group (B), followed by stirring and filtering the mixture.

The paint for primer layer was applied on a nonmagnetic support composed of a polyethylene naphthalate film (thickness of 6.2 μm, MD=6.08 Pa, MD/TD=1.1; manufactured by TEIJIN) so that the primer layer could have a thickness of 1.8 μm after dried and calendered, and then, the paint for magnetic layer was applied on the primer layer by a wet-on-wet method so that the magnetic layer could have a thickness of 0.15 μm after oriented in a magnetic field, dried and calendered. After the orientation in the magnetic field, the magnetic layer was dried with a drier to obtain a magnetic sheet. The orientation in the magnetic field was carried out by arranging N—N opposed magnets (5 kG) in front of the drier, i.e., arranging two N—N opposed magnets (5 kG) spaced 50 cm from each other, at a position 75 cm before a position where the dryness of the layer was confirmed by one's fingers within the drier. The coating rate was 100 m/min.

<Components of a Paint for a Backcoat Layer>

| | |
|---|---|
| Carbon black (particle size: 25 nm) | 78 parts (41.5 wt. %) |
| Carbon black (particle size: 350 nm) | 10 parts (5.3 wt. %) |
| [Total carbon black: | 88 parts (46.8 wt. %)] |
| Red iron oxide A (particle size: 0.1 μm) | 10 parts (5.3 wt. %) |
| Red iron oxide B (particle size: 0.27 μm) | 2 parts (1.1 wt. %) |
| [Total nonmagnetic powder: | 100 parts (53.2 wt. %)] |
| Nitrocellulose (NC) | 44 parts (23.4 wt. %) |
| Polyurethane resin (containing —$SO_3Na$ groups) | 31 parts (16.4 wt. %) |
| Cyclohexanone | 260 parts |
| Toluene | 260 parts |
| Methyl ethyl ketone | 525 parts |

The components of a paint for a backcoat layer were dispersed in a sand mill in residence time of 45 minutes and a polyisocyanate (13 parts, 6.9 wt. %) was added to the mixture to obtain a paint for backcoat layer. After filtration, the paint was coated on a surface of the above magnetic sheet opposite to the magnetic layer so that the backcoat layer could have a thickness of 0.5 μm after dried and calendered, and then, the backcoat layer was dried to finish the magnetic sheet.

The magnetic sheet obtained was planished by seven-stage calendering using metal rolls at a temperature of 100° C. under a linear pressure of 147 kN/m (150 kgf/cm), and wound onto a core and aged at 70° C. for 72 hours. The magnetic sheet was cut into a plurality of magnetic tapes with a width of ½ inch. Then, the magnetic tape was subjected to LRT treatment under the following conditions. Then, pits for optical servo were formed on the backcoat layer, using the apparatus for forming and cleaning optical servo tracks shown in FIG. 7. The backcoat layer was cleaned by spraying solid $CO_2$ thereto. The magnetic tape thus obtained was set in a cartridge to provide a tape for use in a computer. The apparatus for forming and cleaning optical servo tracks, and the treatment using the same apparatus will be described later.

<LRT (Lapping/Rotary/Tissue) Treatment>
(1) Lapping

An abrasive tape (lapping tape) was moved by rotary rolls at a rate of 14.4 cm/min. in a direction opposite to the feeding direction of the magnetic tape (400 m/min.), while being pressed down from above by a guide block (4) to contact with the surface of the magnetic layer of the magnetic tape. In this step, the magnetic layer was polished while the unwinding tension of the magnetic tape being maintained at 100 g and the tension of the lapping tape, at 250 g.

(2) Rotary Aluminum Wheel Treatment

An aluminum rotary wheel which had a width of 1 inch. (25.4 mm), a diameter of 60 mm, and air-bleeding grooves with a width of 2 mm (the angle of groove: 45 degrees, manufactured by KYOWA SEIKO Co., Ltd.;) was rotated at a revolution rate of 1,100 rpm in a direction opposite to the feeding direction of the magnetic tape, in contact with the magnetic layer of the magnetic tape at a contact angle of 90 degrees. Thus, the surface of the magnetic layer was treated.

(3) Tissue Treatment

A tissue (a woven fabric: Toraysee manufactured by Toray) was fed at a rate of 14.0 mm/min. in a direction opposite to the feeding direction of the magnetic tape by rotary bars to clean the surfaces of the backcoat layer and the magnetic layer of the magnetic tape.

Hereinafter, the treatments using the apparatus for forming and cleaning optical servo tracks, as mentioned above, are described.

As shown in FIG. 7, the apparatus for forming and cleaning optical servo tracks comprises a tape-feeding mechanism (11) for feeding a reeled magnetic tape (1) in a predetermined direction; an optical servo track-forming unit (12) for forming pits for optical servo on the surface of the backcoat layer of the fed magnetic tape (1) by irradiation with laser beams; a cleaning unit (13) for cleaning the surface of the backcoat layer after the formation of the pits; and a tape-winding mechanism for winding the magnetic tape (1) after cleaning.

In the cleaning unit (13), there are arranged a $CO_2$-spraying section equipped with a spray nozzle (15) for spraying solid $CO_2$ onto the above pits and their peripheries; a sucking section equipped with a suction nozzle (a sucking means) (16) for sucking the burnt residues which have been blown by the solid $CO_2$-spraying and adhered to the pits and their peripheries; and a wiping section (17) for wiping the surface of the backcoat layer with a tissue cleaner after the suction of the burnt residues.

The spray nozzle (15) provided in the $CO_2$-spraying section has $CO_2$-spraying orifices (15a) which correspond to a pattern for tracks of pits for optical servo, arranged in the widthwise direction of the magnetic tape (1), as shown in FIG. 3. The spray nozzle (15) is set above the surface of the backcoat layer (2) of the magnetic tape (1), inclining by 30° thereto (see FIG. 3). The solid $CO_2$ is obliquely sprayed onto a $CO_2$-receiving portion (B) of the backcoat layer (2), toward a direction reverse to the tape-running direction. The suction nozzle (16) provided in the sucking section has suction ports (16a) which are located in the vicinity of the above $CO_2$-receiving portion (B) of the backcoat layer. The nozzle (16) sucks the burnt residues which have been separated from the surface of the backcoat layer by the spraying of the solid $CO_2$, through its suction ports (16a) and removes them from the surface of the backcoat layer.

The wiping section (17) comprises tissue cleaners (18, 19) arranged so as to contact with the surfaces of the magnetic layer and the backcoat layer of the magnetic tape (1), and a respective pair of rollers (20, 21) which hold and wind the tissue cleaners (18, 19) at predetermined speeds. The tissue cleaners (18, 19) are pressed against the surfaces of the magnetic layer and the backcoat layer of the magnetic tape (1), respectively, to wipe and remove unwanted particles adhered thereto.

In addition, the apparatus shown in FIG. 7 is provided with tension-controlling means as follows. That is, a first suction roll (22) is arranged between the optical servo track-forming unit (12) and the suction nozzle (16); a second suction roll (23), between the spray nozzle (15) and the wiping section (17); and a third suction roll (24), between the wiping section (17) and the winding unit (14). A tension arm (25) is arranged between the tape-feeding mechanism (11) and the optical servo track-forming unit (12); and a tension arm (26), between the third suction roll (24) and the winding mechanism (14). The tension arms (25, 26) are to control the tension of the magnetic tape (1). Further, a tension detector (27) is arranged between the second suction roll (23) and the spray nozzle (15); and a tension detector (28), between the second suction roll (23) and the wiping section (17). The tension detectors (27, 28) are provided to detect the tension of the magnetic tape (1) and control the tension thereof. Thus, an optimal tension is separately applied to the magnetic tape (1) at each of the optical servo track-forming unit (12), and the $CO_2$-spraying section and the wiping section (17) in the cleaning unit (13), by interrupting the transmission of the tension of the magnetic tape (1) via each of the suction rolls (22 to 24), and feedback-controlling the values of the tension detectors (27, 28) via a servo motor which rotates each of the suction rolls (22 to 24).

In the Examples of the present invention, the above apparatus was used to run the magnetic tape at 10 m/sec. while maintaining the tension of the magnetic tape at 150 g, so as to form a pattern of pits for optical servo as described below, on the magnetic tape, to spray solid $CO_2$, and to clean the tape by removing the burnt residues.

<Formation of Pattern of Pits for Optical Servo>

In the optical servo track-forming unit (12) of the apparatus shown in FIG. 7, the surface of the backcoat layer of the magnetic tape (1) was irradiated with laser beams to form pits for optical servo thereon. As a pattern of pits for optical servo, tracks of pits were formed as four bands each having a width of about 0.4 mm, and such four bands were widthwise arranged on the tape which had a width of 12.64 mm, as shown in FIG. 6.

<Solid $CO_2$-Spraying Treatment>

Next, the solid $CO_2$-spraying nozzle (15) and the suction nozzle (16) were used to remove substantially all of burnt residues which had been formed by the above irradiation with laser beams. The spray nozzle (15) was inclined by 30° relative to the surface of the backcoat layer, as described above.

<Cleaning Treatment>

Finally, the tissue cleaners (18, 19) provided in the wiping section (17) were used to completely remove the residual burnt residues. Thus, the finished magnetic tape could have a Brδ of 0.045 μTm (the product of the residual magnetic flux density and the thickness of the magnetic layer in the tape lengthwise direction), and a coercive force Hc of 192 kA/m.

Example 2

A magnetic tape was obtained substantially in the same manner as in Example 1, except that the calendering conditions were changed, that is, the temperature and the linear pressure were changed from 100° C. and 147 kN/m (150 kgf/cm) to 90° C. and 294 kN/m (300 kgf/cm).

Example 3

A magnetic tape was obtained substantially in the same manner as in Example 1, except that the calendering conditions were changed, that is, the temperature and the linear pressure were changed from 100° C. and 147 kN/m (150 kgf/cm) to 120° C. and 294 kN/m (300 kgf/cm).

Example 4

A magnetic tape was obtained substantially in the same manner as in Example 1, except that the thickness of the backcoat layer was changed from 0.5 μm to 0.4 μm.

Example 5

A magnetic tape was obtained substantially in the same manner as in Example 1, except that the thickness of the backcoat layer was changed from 0.5 μm to 0.6 μm.

Example 6

A magnetic tape having a total thickness of 5.7 μm, Brδ of 0.030 μTm, and a coercive force Hc of 192 kA/m was obtained substantially in the same manner as in Example 1, except that a nonmagnetic support with a thickness of 4.0 μm, a primer layer with a thickness of 1.0 μm and a magnetic layer with a thickness of 0.1 μm were used, and that the thickness of the backcoat layer was changed from 0.5 μm to 0.6 μm.

Examples 7 to 10

Magnetic tapes were obtained substantially in the same manner as in Example 1, except that backcoat layers having the composition ratios shown in Table 1 were used.

Reference Example 1

A magnetic tape was obtained substantially in the same manner as in Example 1, except that the solid $CO_2$-spraying treatment was omitted.

Comparative Examples 1 to 6

Magnetic tapes were obtained substantially in the same manner as in Example 1, except that backcoat layers having the thickness and the composition ratios shown in Table 2 were used.

Comparative Example 7

A magnetic tape having a total thickness of 5.7 μm was obtained substantially in the same manner as in Comparative Example 3, except that a nonmagnetic support with a thickness of 4.0 μm, a primer layer with a thickness of 1.0 μm and a magnetic layer with a thickness of 0.1 μm were used, and that the thickness of the backcoat layer was changed from 0.5 μm to 0.6 μm.

TABLE 1

|  | Ex. 1 | Ex. 7 | Ex. 8 | Ex. 9 | Ex. 10 |
|---|---|---|---|---|---|
| Small particle size CB | 41.5 wt. % | 40.0 wt. % | 42.1 wt. % | 47.0 wt. % | 47.3 wt. % |
| Particle size (nm) | 25 | 25 | 25 | 17 | 25 |
| Large particle size CB | 5.3 wt. % | 5.0 wt. % | 7.4 wt. % | 2.5 wt. % | 6.8 wt. % |
| Particle size (nm) | 350 | 370 | 370 | 280 | 280 |
| Ratio of large particle size CB[*1] | 11.3 wt. % | 11.1 wt. % | 11.2 wt. % | 5.0 wt. % | 12.5 wt. % |
| Ratio of CB[*2] | 88.0 wt. % | 90.0 wt. % | 89.9 wt. % | 89.3 wt. % | 90.9 wt. % |
| Red iron oxide A | 5.3 wt. % | 5.0 wt. % | 4.9 wt. % | 5.4 wt. % | 4.5 wt. % |
| Particle size (μm) | 0.1 | 0.1 | 0.1 | 0.1 | 0.1 |
| Red iron oxide B | 1.1 wt. % | — | 1.0 wt. % | 1.5 wt. % | 0.9 wt. % |
| Particle size (μm) | 0.27 | | 0.20 | 0.20 | 0.20 |
| $BaSO_4$ | — | — | — | — | — |
| Particle size (μm) | | | | | |
| Ratio of nonmagnetic powder | 53.2 wt. % | 50.0 wt. % | 55.4 wt. % | 55.4 wt. % | 59.5 wt. % |
| NC | 23.4 wt. % | 25.0 wt. % | 22.3 wt. % | 22.3 wt. % | 20.3 wt. % |
| Polyurethane | 16.4 wt. % | 17.5 wt. % | 14.8 wt. % | 14.9 wt. % | 13.5 wt. % |
| Crosslingking agent | 6.9 wt. % | 7.5 wt. % | 7.4 wt. % | 7.4 wt. % | 6.8 wt. % |

Notes:
[*1]The ratio of large particle size carbon black in a whole of carbon black.
[*2]The ratio of carbon black in nonmagnetic powder.

TABLE 2

|  | Com.Ex. 1 | Com.Ex. 2 | Com.Ex. 3 | Com.Ex. 4 | Com.Ex. 5 | Com.Ex. 6 |
|---|---|---|---|---|---|---|
| Small particle size CB | 38.6 wt. % | 33.8 wt. % | 35.9 wt. % | 42.8 wt. % | 38.7 wt. % | 38.7 wt. % |
| Particle size (nm) | 17 | 17 | 17 | 17 | 17 | 17 |
| Large particle size CB | 1.6 wt. % | — | — | 0.09 wt. % | 7.8 wt. % | 3.9 wt. % |
| Particle size (nm) | 270 | | | 280 | 280 | 280 |
| Ratio of large particle size CB[*1] | 4.0 wt. % | — | — | 2.0 wt. % | 16.8 wt. % | 9.2 wt. % |
| Ratio of CB[*2] | 90.3 wt. % | 100.0 wt. % | 100.0 wt. % | 99.7 wt. % | 95.9 wt. % | 87.8 wt. % |
| Red iron oxide A | — | — | — | — | — | 3.9 wt. % |
| Particle size (μm) | | | | | | 0.1 |
| Red iron oxide B | — | — | — | 0.04 wt. % | 0.03 wt. % | 0.1 wt. % |
| Particle size (μm) | | | | 0.2 | 0.2 | 0.2 |
| $BaSO_4$ | 4.3 wt. % | — | — | — | 1.9 wt. % | 1.9 wt. % |
| Particle size (μm) | 0.05 | | | | 0.05 | 0.05 |
| Ratio of nonmagnetic powder | 44.5 wt. % | 33.8 wt. % | 35.9 wt. % | 43.0 wt. % | 48.5 wt. % | 48.5 wt. % |
| NC | 27.9 wt. % | 20.2 wt. % | 19.6 wt. % | 42.8 wt. % | 38.7 wt. % | 38.7 wt. % |
| Polyurethane | 18.4 wt. % | 33.8 wt. % | 32.7 wt. % | 12.9 wt. % | 11.6 wt. % | 11.6 wt. % |
| Crosslingking agent | 9.3 wt. % | 12.2 wt. % | 11.8 wt. % | 1.3 wt. % | 1.2 wt. % | 1.2 wt. % |

Notes:
[*1]The ratio of large particle size carbon black in a whole of carbon black.
[*2]The ratio of carbon black in nonmagnetic powder.

Example 11

Pits for optical servo were formed on the backcoat layer of a magnetic tape, using an apparatus for forming and cleaning optical servo tracks shown in FIG. 9. After that, a tape for a computer was obtained substantially in the same manner as in Example 1, except that a contact-removing treatment using a raised fabric or the like, and a cleaning treatment, as described below, were carried out on the magnetic tape.

The apparatus shown in FIG. 9 and the treatments using this apparatus are explained.

The apparatus used in Example 11 comprises, as shown in FIG. 9, a tape-feeding mechanism (11) for feeding a reeled magnetic tape (1) in a predetermined direction; an optical servo track-forming unit (12) for forming pits for optical servo on the surface of the backcoat layer of the fed magnetic tape (1) by irradiation with laser beams; a cleaning unit (13) for cleaning the surface of the backcoat layer (2) after the formation of the pits; and a tape-winding mechanism (14) for winding the magnetic tape (1) after cleaning.

The cleaning unit (13) comprises a contact-removing section for allowing raised cloth such as a raised fabric or woven or nonwoven fabric having raising fibers thereon, to contact with the surface of the backcoat layer, in order to clean the surface of the backcoat layer, and a wiping section (17) for wiping the surfaces of the backcoat layer and the magnetic layer with tissue cleaners.

In the contact-removing section (15b), a wrapped drum (30) as shown in FIG. 8 is arranged. The wrappeded drum (30) comprises a rotary drum (31) (having a diameter of 100 mm in this Example) which is rotated in a direction reverse to the running direction of the magnetic tape (1) and is wrapped with raised cloth (32) at its circumference. A pair of guide rollers (41, 41) are arranged before and after the wrapped drum (30) so as to allow the drum (30) to contact with the surface of the backcoat layer of the magnetic tape (1) in a predetermined condition.

The wiping section (17) includes tissue cleaners (18, 19) which are arranged so as to contact with the surfaces of the magnetic layer and the backcoat layer of the magnetic tape (1), respectively, and two pairs of rollers (20, 21) which hold the tissue cleaners (18, 19), respectively, so that the tissue cleaners can be wound at predetermined velocities. The tissue cleaners (18, 19) are pressed against the surfaces of the magnetic layer and the backcoat layer, respectively, so as to wipe and remove the unwanted particles thereon.

In addition, the apparatus shown in FIG. 9 is provided with means for controlling the tension of the tape described below. That is, a first suction roll (22) is arranged between the optical servo track-forming unit (12) and the contact-removing section (15b); a second suction roll (23), between the contact-removing section (15b) and the wiping section (17); and a third suction roll (24), between the wiping section (17) and the winding mechanism (14). A tension arm (25) is arranged between the tape-feeding mechanism (11) and the optical servo track-forming unit (12); and a tension arm (26), between the third suction roll (24) and the winding mechanism (14). The tension arms (25, 26) are provided to control the tension of the magnetic tape (1). Further, a tension detector (27) is arranged between the second suction roll (23) and the contact-removing section (15b); and a tension detector (28), between the second suction roll (23) and the wiping section (17). The tension detectors (27, 28) are provided to detect the tension of the magnetic tape (1) and control the tension thereof. An optimal tension is separately applied to the magnetic tape (1) at each of the optical servo track-forming unit (12), and the contact-removing section (15b) and the wiping section (17) in the cleaning unit (13), by interrupting the transmission of the tension of the magnetic tape (1) via each of the suction rolls (22 to 24), and feedback-controlling the values of the tension detectors (27, 28) via a servo motor which rotates each of the suction rolls (22 to 24).

In the Examples of the present invention, the above apparatus was used to run the magnetic tape at 10 m/sec. while maintaining the tension of the magnetic tape constant, so as to form a pattern of pits for optical servo on the magnetic tape, to treat the magnetic tape by contacting the wrapped drum (30), and to wipe the same with the tissue cleaners (18, 19) for cleaning.

<Formation of Pattern of Pits for Optical Servo>

In the optical servo track-forming unit (12) of the apparatus shown in FIG. 9, the surface of the backcoat layer of the magnetic tape (1) was irradiated with laser beams so as to form a predetermined pattern of pits for optical servo thereon. As the pattern of pits for optical servo, tracks of pits were formed as four bands each having a width of about 0.4 mm, and such four bands were widthwise arranged on the tape which had a width of 12.64 mm, as shown in FIG. 6.

<Contact-Removing Treatment Using Wrapped Drum>

Next, in the contact-removing section (15b), the wrapped drum (30) was rotated at a rate of 314 radian/sec. (3,000 rpm) in a direction reverse to the tape-running direction, while the raised cloth (32) wrapping the outer circumference of the drum (30) was allowed to contact with the surface of the backcoat layer (2) of the magnetic tape (1) under a tension of 2.0 N to remove substantially all of the burnt residues which had formed by baking with laser beams in the step of forming the servo pattern, from the interiors of the pits and their peripheries on the backcoat layer. As the raised cloth (32) wrapping the drum (30), velvet on which 2.5 mm yarns obtained by twisting 4 cotton single fibers having a diameter of 4 μm were flocked was used. The tension applied on the side of the inlet was 86 g, and that on the side of the outlet, 208 g. The contact angle between the wrapped drum (30) and the magnetic tape (1) was 120°.

<Cleaning Treatment>

Finally, the tissue cleaners (18, 19) provided in the wiping section (17) were used to completely remove the residual burnt residues. Thus, the finished magnetic tape could have a Brδ of 0.045 μTm, and a coercive force Hc of 192 kA/m. The average reflectance of the magnetic tape was 9.0%; the rate of fluctuation thereof, 3.0%; the surface roughness Ra thereof, measured with AFM, 25.1 nm; and the half width of Ra, 3.3 nm. The S/N of the servo signal of Example 11 was 1.5 dB, on the assumption that the S/N of the servo signal of Reference Example 2 was 0 dB, and it was 6.1 dB, on the assumption that the S/N of the servo signal of Comparative Example 1 was 0 dB.

Example 12

A magnetic tape was obtained substantially in the same manner as in Example 11, except that the contact angle between the magnetic tape (1) and the wrapped drum (30) was changed to 90°.

Example 13

A magnetic tape was obtained substantially in the same manner as in Example 11, except that the rotation velocity of the wrapped drum (30) was changed to 188.4 radian/sec. (1,800 rpm). The tension of the tape on the side of the inlet was 95 g, and that on the side of the outlet, 188 g, in the step of the contact-removing treatment (treatment at the contact-removing section).

Example 14

A magnetic tape was obtained substantially in the same manner as in Example 11, except that the tension of the tape being subjected to the contact-removing treatment with the wrapped drum was changed to 1.8 N. The tension of the tape on the side of the inlet was 80 g, and that on the side of the outlet, 188 g, in the step of the contact-removing treatment.

Example 15

A magnetic tape having a total thickness of 5.7 μm, a Brδ of 0.030 μTm, and a coercive force of 192 kA/m was obtained substantially in the same manner as in Example 11, except that a nonmagnetic support with a thickness of 4.0 μm, a primer layer with a thickness of 1.0 μm and a magnetic layer with a thickness of 0.1 μm were used, and that the thickness of the backcoat layer was changed from 0.5 μm to 0.6 μm.

Examples 16 to 19

Magnetic tapes were obtained substantially in the same manner as in Example 11, except that raised fabrics, or woven or nonwoven cloths having raising fibers thereon, shown in Table 3, were used as the raised cloth, and that the number of wrapped drums used were changed as shown in Table 8.

Reference Example 2

A magnetic tape was obtained substantially in the same manner as in Example 11, except that the contact-removing treatment using the wrapped drum (30) was omitted. The reflectance on the backcoat layer of the resultant magnetic tape was 8.5%; the rate of fluctuation thereof, 4.0%; the surface roughness Ra thereof, measured with AFM, 25.2 nm; and the half width of Ra, 4.5 nm.

TABLE 3

| | Ex. 11-15 | Ex. 16 | Ex. 17 | Ex. 18 | Ex. 19 |
|---|---|---|---|---|---|
| Raised fabric | Cotton pile long fiber | Cotton pile short fiber | Rayon short fiber | Polyester short fiber | Polyester long fiber |
| Kind of fiber | Cotton | Cotton | Rayon | Polyester | Polyester |
| Diameter of single fiber | 4 μm | 4 μm | 5 μm | 2 μm | 10 μm* |
| Number of fibers twisted | 2 | 4 | 1 | 1 | 1 |
| Length of fiber | 2.5 mm | 1.65 mm | 1.5 mm | 0.5 mm | 4 mm |

*The tip end of the single fiber was split into 8 pieces.

The measurement and the evaluation were conducted as follows.

<Reflectance>

The reflectance on the flat portion of a magnetic tape was evaluated using a spectrometer (UNISOF), on condition that the incident angle was 20°, and the reflection angle, 20°. A light emitting diode (or LED) of a wavelength of 880 nm was used as a light source. The spot diameter was 100 μm. The reflectance was measured at 400 points per 40 mm of the magnetic tape to determine the average reflectance and the maximum rate of fluctuation thereof. The average reflectance was a simple average value of the reflectance, and the maximum rate of fluctuation was the percentage of a value which was found by dividing the maximum of the deviation from the average reflectance by the average reflectance. The reflectance on the flat portion of the magnetic tape which had been run, and the maximum rate of fluctuation thereof were measured by running the magnetic tape twice with a LTO drive, and cutting the magnetic tape for the measurement.

<Evaluation of Surface Roughness Ra with AFM>

The average surface roughness Ra of a magnetic tape was measured using an AFM (Dimension™ 3100 manufactured by Digital-Instrument Co., Ltd.). The scanning mode was a tapping mode AFM. In the tapping mode, a cantilever equipped at its tip end with a probe was vibrated with around a resonant frequency (about 50 to about 500 kHz) using a piezo-vibrator, while the probe was being allowed to intermittently and softly touch (or tap) the surface of the tape sample so as to scan the tape. A change in the amplitude of the cantilever due to the unevenness of the surface of the sample was evaluated using laser beams. The field of view for the measurement was 40 μm×40 μm. The fluctuation of the surface roughness Ra depending on a site of the magnetic tape was determined from the half width of the fluctuation of Ra as follows: the surface roughness Ra was measured at 100 points which were spaced at regular intervals per 40 mm length of the magnetic tape, and Ra at each point was plotted on the axis of abscissa, and the frequency (1 nm pitch), on the axis of ordinate, so that the half width of the fluctuation of Ra was determined from the resultant graph.

<S/N of Servo signal on Servo Track>

Light with a center wavelength of 880 nm was caused to emit onto the backcoat layer at an incident angle of 20°, and the S/N of a servo signal was measured from the reflecting light, using the servo signal-measuring section of a floptical drive. The S/N of the servo signals of Examples 1 to 10, Reference Example 1 and Comparative Examples 2 to 7 were represented as relative values based on the S/N of Comparative Example 1 as a standard (0 dB). The S/N of the servo signals of Examples 11 to 19 were represented as relative values based on the S/N of Reference Example 2 as a standard (0 dB).

<Measurement of Error Rate>

The error rate (or ERT) was measured by recording and reproducing signals on and from a magnetic tape (recording wavelength: 0.37 μm) using a LTO drive which was improved so as to be used on a thinner tape. The ERT was a value obtained in the test mode.

<Evaluation of Magnetic Properties>

The magnetic properties of a magnetic layer and ferromagnetic powder were evaluated using a vibration sample magnetometer (manufactured by Toei Kogyo Co., Ltd.). The external magnetic field was 1.28 MA/m (16 kOe).

The results of the evaluation of the magnetic tapes of Examples 1 to 10 and Comparative Examples 1 to 7 are shown in Tables 4 to 7.

TABLE 4

| | Ex. 1 | Ex. 2 | Ex. 3 | Ex. 4 | Ex. 5 |
|---|---|---|---|---|---|
| Reflectance (initial) | | | | | |
| Av. reflectance (%) | 9.0 | 10.2 | 11.5 | 8.8 | 9.5 |
| Rate of | 3.0 | 3.4 | 5.0 | 3.5 | 2.8 |

TABLE 4-continued

|  | Ex. 1 | Ex. 2 | Ex. 3 | Ex. 4 | Ex. 5 |
|---|---|---|---|---|---|
| fluctuation (%) | | | | | |
| Reflectance after twice tape-running: | | | | | |
| Av. reflectance (%) | 9.2 | 9.8 | 10.0 | 8.6 | 9.4 |
| Rate of fluctuation (%) | 3.5 | 3.8 | 7.5 | 3.7 | 3.1 |
| Ratio of nonmagnetic powder | 53.2 wt. | 53.2 wt. | 53.2 wt. | 53.2 wt. | 53.2 wt. |
| Surface roughness with AFM (initial) | | | | | |
| Ra (nm) | 25.2 | 23.4 | 21.5 | 29.5 | 24.1 |
| Half width of Ra (nm) | 3.0 | 3.8 | 4.8 | 4.1 | 2.7 |
| Surface roughness after twice tape-running: | | | | | |
| Ra (nm) | 25.1 | 23.8 | 25.2 | 29.5 | 23.9 |
| Half width of Ra (nm) | 3.3 | 4.0 | 8.5 | 4.5 | 3.0 |
| Servo signal (initial) S/N (relative value) | 6.1 | 6.1 | 5.0 | 5.4 | 6.6 |
| Servo signal after twice tape-running: S/N (relative value) | 5.5 | 5.5 | 2.6 | 5.0 | 6.2 |
| Error rate (initial) × $10^{-8}$ | 0.5 | — | — | — | — |

TABLE 5

|  | Ex. 6 | Ex. 7 | Ex. 8 | Ex. 9 | Ex. 10 |
|---|---|---|---|---|---|
| Reflectance (initial) | | | | | |
| Av. reflectance (%) | 9.1 | 8.5 | 10.5 | 12.3 | 14.9 |
| Rate of fluctuation (%) | 3.1 | 4.5 | 4.2 | 3.2 | 4.5 |
| Reflectance after twice tape-running: | | | | | |
| Av. reflectance (%) | 9.1 | 8.6 | 10.4 | 11.2 | 13.4 |
| Rate of fluctuation (%) | 3.6 | 5.0 | 4.7 | 4.9 | 5.0 |
| Ratio of nonmagnetic powder | 53.2 wt. | 50.0 wt. | 55.4 wt. | 55.4 wt. | 59.5 wt. |
| Surface roughness with AFM (initial) | | | | | |
| Ra (nm) | 25.0 | 22.5 | 27.5 | 24.7 | 29.4 |
| Half width of Ra (nm) | 2.9 | 4.9 | 4.4 | 3.9 | 4.7 |
| Surface roughness after twice tape-running: | | | | | |
| Ra (nm) | 24.9 | 23.1 | 27.2 | 28.2 | 29.9 |
| Half width of Ra (nm) | 3.1 | 4.0 | 4.5 | 5.5 | 5.0 |
| Servo signal (initial) S/N (relative value) | 6.0 | 4.1 | 5.3 | 7.2 | 6.5 |
| Servo signal after twice tape-running: S/N (relative value) | 5.4 | 3.7 | 4.8 | 4.9 | 5.6 |

TABLE 6

|  | Ref. Ex. 1 | Com. Ex. 1 | Com. Ex. 2 | Com. Ex. 3 | Com. Ex. 4 |
|---|---|---|---|---|---|
| Reflectance (initial) | | | | | |
| Av. reflectance (%) | 8.5 | 7.7 | 6.8 | 7.0 | 7.4 |
| Rate of fluctuation (%) | 4.0 | 10.5 | 10.4 | 10.0 | 10.4 |
| Reflectance after twice tape-running: | | | | | |
| Av. reflectance (%) | 8.7 | 7.2 | 6.4 | 6.8 | 7.2 |
| Rate of fluctuation (%) | 12.5 | 15.6 | 16.1 | 15.4 | 13.9 |
| Ratio of nonmagnetic powder | 53.2 wt. | 44.5 wt. | 33.8 wt. | 35.9 wt. | 43.0 wt. |
| Surface roughness with AFM (initial) | | | | | |
| Ra (nm) | 25.2 | 19.7 | 32.4 | 25.6 | 21.9 |
| Half width of Ra (nm) | 4.5 | 7.1 | 10.5 | 7.0 | 7.7 |
| Surface roughness after twice tape-running: | | | | | |
| Ra (nm) | 25.1 | 19.9 | 33.1 | 27.2 | 23.1 |
| Half width of Ra (nm) | 7.2 | 8.3 | 12.6 | 8.2 | 8.0 |
| Servo signal (initial) S/N (relative value) | 4.6 | 0.0 | −0.5 | −0.2 | −0.1 |
| Servo signal after twice tape-running: S/N (relative value) | −0.2 | −2.0 | −2.7 | −2.2 | −1.5 |
| Error rate (initial) × $10^{-8}$ | 1200 | — | — | — | — |

TABLE 7

|  | Com. Ex. 5 | Com. Ex. 6 | Com. Ex. 7 |
|---|---|---|---|
| Reflectance (initial) | | | |
| Av. reflectance (%) | 8.0 | 7.8 | 7.1 |
| Rate of fluctuation (%) | 8.2 | 8.6 | 10.4 |
| Reflectance after twice tape-running: | | | |
| Av. reflectance (%) | 8.1 | 7.8 | 6.7 |
| Rate of fluctuation (%) | 9.8 | 9.9 | 16.2 |
| Ratio of nonmagnetic powder | 48.5 wt. | 48.5 wt. | 35.9 wt. |
| Surface roughness with AFM (initial) | | | |
| Ra (nm) | 22.1 | 21.9 | 25.9 |
| Half width of Ra (nm) | 7.5 | 7.7 | 7.2 |
| Surface roughness after twice tape-running: | | | |
| Ra (nm) | 22.0 | 22.3 | 27.9 |
| Half width of Ra (nm) | 7.6 | 7.8 | 8.1 |
| Servo signal (initial) S/N (relative value) | 1.2 | 0.9 | −0.3 |
| Servo signal after twice tape-running: S/N (relative value) | 0.5 | 0.3 | −2.5 |

As is apparent from the results of Examples 1 to 10 and Comparative Examples 1 to 7 shown in Tables 4 to 7, the magnetic tapes were high in the initial S/N of the servo signals, and also high in the S/N thereof found after the magnetic tapes had been run twice, when their average reflectances were 8.5% or higher on the flat portions, and their maximum coefficients of fluctuation of reflectance on the flat portions, depending on positions of the magnetic tapes, i.e., [maximum of the absolute value of (reflectance−average reflectance)]×100/(average reflectance), were 10% or lower. Also, as is apparent from the results of Example 1 and Reference Example 1, by carrying out the solid $CO_2$ spraying treatment, the error rate was decreased and the S/N of the servo signal found after the magnetic tape had been run twice was increased. Thus, this treatment is found to be effective to remove the burnt residues in the pits of the backcoat layers.

The results of the evaluation of the magnetic tapes of Examples 11 to 19 and Reference Example 2 are shown in Table 8.

TABLE 8

|  | Ex. 11 | Ex. 12 | Ex. 13 | Ex. 14 | Ex. 15 |
|---|---|---|---|---|---|
| Error rate (initial) × $10^{-8}$ | 0.5 | 1.0 | 2.0 | 5 | 0.6 |
| Number of wrapped drums | 1 | 1 | 1 | 1 | 1 |

|  | Ex. 16 | Ex. 17 | Ex. 18 | Ex. 19 | Ref. Ex. 2 |
|---|---|---|---|---|---|
| Error rate (initial) × $10^{-8}$ | 0.5 | 2.0 | 1.0 | 0.5 | 1200 |
| Number of wrapped drums | 2 | 4 | 2 | 2 | 0 |

As is apparent from the results of Examples 11 to 19 and Reference Example 2 shown in Table 8, the magnetic tapes having low error rates can be obtained by carrying out the step of allowing the raised fabrics or woven or nonwoven cloths having raising fibers thereon to contact with the surfaces of the backcoat layers of the magnetic tapes, thereby removing the burnt residues adhered to the pits for optical servo and their peripheries on the backcoat layers, in the course of cleaning the surfaces of the backcoat layers of the magnetic tapes.

In other words, a magnetic tape as follows is high in the initial S/N of the servo signal, and also high in the S/N of the servo signal found after the magnetic tape has been run twice: that is, such a magnetic tape comprises a nonmagnetic support; a magnetic layer which is formed on one surface of the nonmagnetic support; and a backcoat layer which contains nonmagnetic powder and a binder and which is formed on the other surface of the nonmagnetic support, having pits for optical servo formed thereon, and the magnetic tape is characterized in that the average reflectance on the flat portion of the backcoat layer is 8.5% or higher, and that the maximum rate of fluctuation of the reflectance on the flat portion depending on a position of the magnetic tape, i.e., [maximum of absolute value of (reflectance−average reflectance)]×100/(average reflectance), is 10% or lower. Further, the error rate is decreased, and the S/N of the servo signal is increased, by cleaning the backcoat layer of the magnetic tape, i.e., by spraying solid $CO_2$ onto the backcoat layer or by allowing a raised fabric to contact with the surface of the backcoat layer. Therefore, these treatments are effective to remove the burnt residues adhered to the pits of the backcoat layer.

The invention claimed is:

1. A magnetic tape comprising a nonmagnetic support, a magnetic layer which is formed on one surface of the nonmagnetic support, and a backcoat layer which comprises a binder and nonmagnetic powder containing carbon black as a component and which is formed on the other surface of the nonmagnetic support and has pits for optical servo formed thereon, said pits having been formed by irradiation with a laser beam and burnt residues formed by the irradiation of the laser beam having been removed from said pits, characterized in that a content of the nonmagnetic powder in the backcoat layer is from 50 wt. % to 60 wt. % based on the total weight of the nonmagnetic powder and the binder in the backcoat layer, that an average surface roughness Ra of the flat portion of the backcoat layer, measured with an atomic force microscope, is from 10 nm to 30 nm, that an average of the reflectance on a flat portion of the backcoat layer is from 8.5% to 14.9%, and that a maximum rate of fluctuation of the reflectance on the flat portion, depending on a position of the magnetic tape:

[Maximum of absolute value of (Reflectance−Average reflectance)]×100/(Average reflectance)

is from 2.8% to 10%.

2. The magnetic tape according to claim 1, wherein a half width of fluctuation of the surface roughness Ra, depending on a position of the magnetic tape, is 5 nm or less.

* * * * *

UNITED STATES PATENT AND TRADEMARK OFFICE
CERTIFICATE OF CORRECTION

PATENT NO.       : 7,803,471 B1                                     Page 1 of 1
APPLICATION NO.  : 10/343432
DATED            : September 28, 2010
INVENTOR(S)      : Hiroyuki Ota et al.

It is certified that error appears in the above-identified patent and that said Letters Patent is hereby corrected as shown below:

ON THE TITLE PAGE:

At item (86), please change the § 371 (c)(1), (2), (4) Date from "Jan. 31, 2003" to -- March 31, 2003 --.

Signed and Sealed this

Seventh Day of December, 2010

David J. Kappos
*Director of the United States Patent and Trademark Office*